United States Patent
Brown

(10) Patent No.: US 6,826,954 B2
(45) Date of Patent: Dec. 7, 2004

(54) METHOD AND APPARATUS FOR FLOW MEASUREMENT

(75) Inventor: George A. Brown, Beaconsfield (GB)

(73) Assignee: Sensor Highway Limited, Southampton (GB)

( * ) Notice: Subject to any disclaimer, the term of this patent is extended or adjusted under 35 U.S.C. 154(b) by 54 days.

(21) Appl. No.: 10/239,600

(22) PCT Filed: Mar. 23, 2001

(86) PCT No.: PCT/GB01/01298

§ 371 (c)(1),
(2), (4) Date: Dec. 23, 2002

(87) PCT Pub. No.: WO01/75403

PCT Pub. Date: Oct. 11, 2001

(65) Prior Publication Data

US 2003/0140711 A1 Jul. 31, 2003

(30) Foreign Application Priority Data

Mar. 30, 2000 (GB) .............................. 0007587

(51) Int. Cl.[7] ................................. G01F 1/68
(52) U.S. Cl. ...................... 73/204.13; 356/44; 356/73.1
(58) Field of Search .......................... 73/202.5, 204.11, 73/204.13, 204.15; 356/44, 73.1; 250/356.1, 215, 216

(56) References Cited

U.S. PATENT DOCUMENTS 5,526,696 A  *  6/1996  Cappi ...................... 73/861.95
6,209,640 B1 *  4/2001  Reimers et al. .......... 166/254.1

* cited by examiner

Primary Examiner—Edward Lefkowitz
Assistant Examiner—Corey D. Mack
(74) Attorney, Agent, or Firm—Wayne I. Kanak; Jeffrey E. Griffin; Brigitte J. Echols

(57) ABSTRACT

A method and apparatus is disclosed for measuring the flow of fluid in the conduit, giving the example of oil in a well bore (12). A heat exchanger such as a cooling station (66) is placed in the well bore (12) and caused to create a slug of cooled oil whose passage, through the well (12) can be monitored by a temperature sensor in the form of a continuous fiber optic loop (62). Knowledge of the movement of the cooled slug of oil and of the free cross-section of the conduit (54) wherein the oil is flowing permits the volume flow-rate of oil to be calculated. Cooling stations (66) are cooled by Joule-Thompson cooling employing high pressure nitrogen gas. Cooling stations (66) may be placed at plural locations within the well bore (12) to monitor individual flows (68) from multiple flow sources.

32 Claims, 18 Drawing Sheets

METHOD AND APPARATUS FOR FLOW MEASUREMENT

BACKGROUND OF THE INVENTION

The present invention relates to a method and apparatus for measuring the rate of flow of a liquid through a conduit. It particularly relates to a method and apparatus for measuring the rate of flow of hydrocarbons in production wells. Most particularly, it relates to a method and apparatus for measuring the rate and flow in production oil or water injection wells, and most especially relates to measurement of rates of flow in production oil wells where more than one source of flow opens into a common well head.

When extracting a flow of production fluids such as oil, from a well, it is important to be able to measure the rate of flow from the well head, and the contribution to the flow which comes from different sources opening into the common well head. In horizontal wells for hydrocarbon production, it is important for optimal recovery to know from which part of the reservoir the flow emanates. In multilateral wells, it is desirable to know how much each lateral contributes to the total production of the reservoir. If a particular lateral is producing too low a flow, it is then possible to take remedial action to increase its contribution.

Well bores are lined with casings whose approximate cross-sectional area is known. The free internal cross-sectional area of production tubing is also known. It is possible to derive a measure of the volume of flow at a specific location by measuring the linear flow-rate, or velocity, at that location.

It is known to measure flow-rates using measuring devices such as propellor driven flow meters. These are difficult to install within a well. The well has very limited cross sectional area thus limiting the size of device that may be installed. Propeller driven flow-rate meters are particularly difficult to install in horizontal wells or sub-sea wells. They are also difficult to install when a number of devices are required at different locations. The present invention seeks to provide a method and apparatus apt for the measurement of flow rate in horizontal wells, vertical wells, sub-sea wells and into the various parts of multilateral wells. The present invention also seeks to provide a method and apparatus for measuring flow rate at a plurality of points, unrestrained by the limitations imposed by the small cross-section of a well bore.

As well as the use of propeller driven devices such as spinner flow-meters, which turn at a rate dependent on the velocity of well fluids flowing past and are lowered down the well on an electric cable or wireline, apt for high flow-rate wells, it is also known in low flow-rate wells, which produce typically less than 1,000 barrels of oil a day, to use a radioactive tracer ejector tool. A radioactive marker (or tracer) is ejected into the oil flow. Gamma ray detectors are mounted above the ejection port on the tool. The ejector has to be replenished with tracers. The amount of time required for the marker or tracer to pass the gamma ray detectors gives a measure of the flow rate in the well. Gamma ray sources are a health hazard and require close custody and a monitoring. The present invention seeks to provide a method and apparatus for measuring flow rate in wells which has the same utility as the use of radioactive sources but lacks the health hazard associated with the radioactive tracer and which can remain permanently installed.

The prior art systems, in horizontal wells, both require deployment using coiled tubing. This is a very expensive proposition, and in sub-sea wells neither a wireline nor coiled tubing deployment systems can be used due to the limited access from the surface. The present invention seeks to provide a method and apparatus that can be so deployed without the expense of coiled tubing.

SUMMARY OF THE INVENTION

The present invention seeks to provide a non-invasive method and apparatus that can be pre-installed with the well, or subsequently at further work on the well, that is capable of monitoring fluid flow rate in well bores along reservoir intervals.

According to a first aspect, the present invention consists in an apparatus for measuring fluid flow in a conduit, said apparatus comprising: a temperature sensor for measuring and providing indication of the temperature of the fluid at at least first and second temperature measuring points spaced by a known distance along the conduit; a heat exchanger selectably operable to alter the temperature of the fluid upstream from said temperature measuring points; and a timer, responsive to said output of said temperature sensor to measure the time difference of arrival of the temperature altered fluid at said first and second temperature measuring points.

According to a second aspect, the present invention consists in a method for measuring fluid flow in a conduit, said method comprising the steps of: measuring the temperature of the fluid at a minimum of two temperature measuring points spaced by a known distance along the conduit; altering the temperature of the fluid upstream from said temperature measuring points; and measuring the time difference of arrival of the temperature altered fluid at said first and second temperature measuring points.

The first aspect of the invention further provides that the heat exchanger is operable to alter the temperature of the fluid for a selectable time.

The first aspect of the invention further provides an apparatus including a flow arrester, selectably operable to arrest the flow of the fluid in the conduit, the flow arrester being operable to arrest the flow of the fluid while the heat exchanger alters the temperature of the fluid, and the flow arrester valve being operable to allow the fluid to flow while the heat exchanger does not alter the temperature of the fluid.

The first aspect of the invention further provides that the temperature sensor can be a fibre optic cable, disposed along the conduit and operative to monitor temperature at a plurality of known, spaced locations along the length of the fibre optical cable.

The first aspect of the invention further provides that the heat exchanger can be operative to heat the fluid or, alternatively, to cool the fluid.

The first aspect of the invention further provides that the heat exchanger can be a gas expansion cooler, can comprise a throttle for cooling the gas and a cooling coil for the throttled gas to extract heat from the fluid, and can comprise a pressure relief valve, operative to allow gas to pass to be expanded if the gas supply pressure exceeds a predetermined limit.

The first aspect of the invention further provides that the apparatus can be for use where the fluid can be a hydrocarbon or water, where the hydrocarbon can be oil and where the conduit can be a hydrocarbon or water well.

The first aspect of the invention further provides that the flow arrester can be a selectably operable surface valve.

The first aspect of the invention further provides an apparatus which can be for use where the conduit has a plurality of flow sources, the apparatus comprising: a plurality of heat exchangers, each heat exchanger being downstream from a respective flow source; the temperature sensor being operative to measure and indicate the temperature at respective first and second points downstream from each heat exchanger; and the timer being operative to measure the time difference of arrival of temperature altered fluid at each respective pair of the first and second temperature measuring points.

The first aspect of the invention further provides an apparatus for use where the cross-sectional area of the conduit is known, the apparatus comprising computation means to calculate the volume rate of flow past the heat exchanger or heat exchangers, where the computation means can also calculate the volume rate of flow from each flow source.

The second aspect of the invention further provides a method including the step of altering the temperature of the fluid for a selectable time.

The second aspect of the invention further provides a method including the further step of arresting the flow of the fluid while altering the temperature of the fluid, and thereafter allowing the fluid to flow while not altering the temperature of the fluid.

The second aspect of the invention further provides a method including the use of a fibre optic cable, disposed along the conduit and operative to monitor temperature at a plurality of known, spaced locations along the length of the fibre optical cable.

The second aspect of the invention further provides a method wherein the step of altering the temperature of the fluid can involve heating the fluid or can involve cooling the fluid.

The second aspect of the invention further provides that the step of cooling the fluid includes the step of gas expansion and can include throttling the gas and passing the throttled gas through a cooling coil for the throttled gas to extract heat from the fluid; and can also include the use of a pressure relief valve to allow gas to pass to be expanded only if the gas supply pressure exceeds a predetermined limit.

The second aspect of the invention further provides a method for use where the fluid can be a hydrocarbon or water, where the hydrocarbon can be oil, and where the conduit can be a hydrocarbon or water well.

The second aspect of the invention further provides a method where the step of arresting the flow of the fluid can include the use of a selectably operable surface valve.

The second aspect of the invention further provides a method, for use where the conduit has a plurality of flow sources, the method comprising the steps of: altering the temperature of the fluid at a plurality of points, each downstream from a respective flow source; measuring the temperature at respective first and second points downstream from each point whereat the temperature has been altered; and measuring the time difference of arrival of temperature altered fluid at each respective pair of the first and second temperature measuring points.

The second aspect of the invention further provides a method for use where the cross-sectional area of the conduit is known, including the step of computing the volume rate of flow past the point or points whereat the temperature of the fluid has been altered.

The second aspect of the invention further provides a method including the step of calculating the volume rate of flow from each flow source.

BRIEF DESCRIPTION OF THE DRAWINGS

The invention is further explained, by way of an example, by the following description, taken in conjunction with the appended drawings, in which.

DETAILED DESCRIPTION

Figure 1:
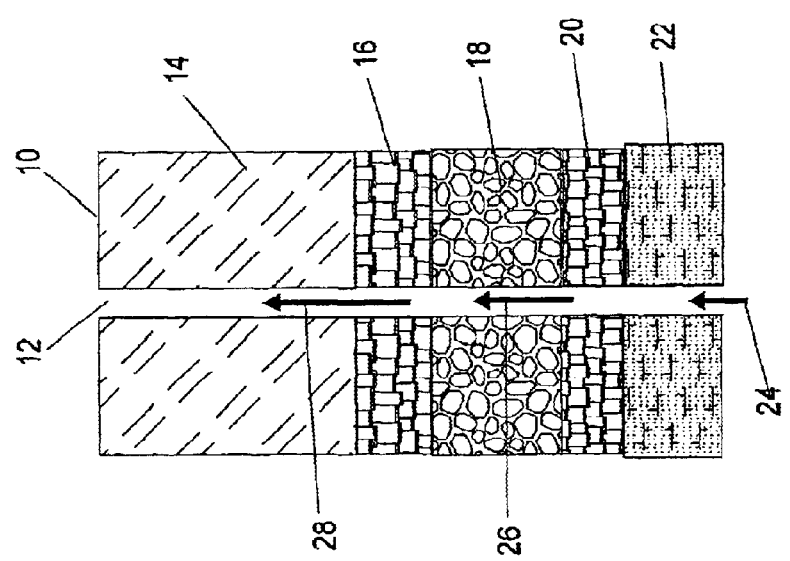
FIG. 1 is a cross-sectional view of multilateral oil well in which the present invention can be applied.

Attention is drawn to FIG. 1 showing a schematic cross-sectional view of a multilateral production well to which the present invention is applicable.

From a surface 10 a well bore 12 passes first through non oil bearing surface rock 14 and formations, then through a first lateral oil bearing formation 16, thereon through non oil bearing intermediate formations 18, on into a second lateral oil bearing formation 20, where the well bore 12 may terminate, or may further penetrate through a further intermediate non oil bearing formation 22 to engage further oil bearing formations there below.

A first arrow 24 is indicative of the flow of oil from those oil bearing formations below the further non oil bearing formation 22. A second arrow 26 shows the flow of oil from the oil bearing layers below FIG. 1, together with the flow of oil from the second lateral oil bearing formation 20. A third arrow 28 shows the flow of oil indicated by the second arrow 26 together with the contribution from the first lateral oil bearing formation 16. It is an object of the present invention to make it possible to measure the contribution made by each or any of the oil bearing formations 16 20 to the overall flow 28 rising in the well bore 12.

Figure 2:
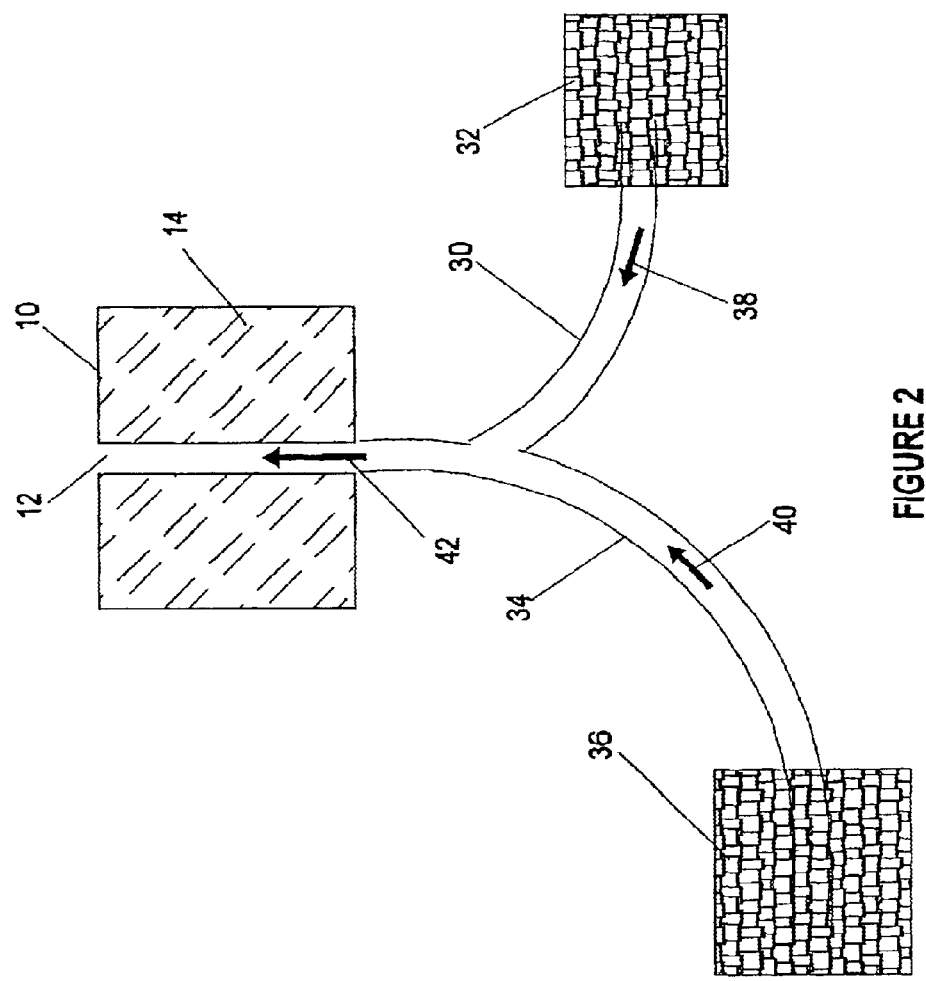
FIG. 2 is a cross-sectional schematic diagram of a multilateral, horizontal oil well to which the present invention can be applied.

Attention is drawn to FIG. 2, showing a horizontal well bore for which the present invention is apt for use.

The well bore 12 passes through the surface rock formations 14 and is gently angled to form a first horizontal lateral bore 30 extending at an angle, which can reach horizontal, into a first horizontally displaced oil bearing formation 32. The well bore 12 is again gently curved to drill and form a second horizontal lateral bore 34 whose angle can be curved as far as the horizontal. The second horizontal lateral bore 34 passes into a second horizontally displaced oil bearing formation 36.

A fourth arrow 38 indicates the flow of oil from the first horizontally displaced oil bearing formation 32. A fifth arrow 40 shows the contribution to the oil flow made by the second horizontally displaced oil bearing formation 36. A sixth arrow 42 shows the sum of the flows indicated by the fourth arrow 38 and the fifth arrow 40 passing up through the well bore 12. FIG. 2 illustrates that a well bore can be curved as far as the horizontal and that a well bore 12 with lateral bores 30 34 can also be multilateral. The manner of disposition of the present invention, is as described in PCT PATENT application WO 98/50681.

The present invention can be applied to measure one, all or some of the flows 38 40 42 in such a situation.

Figure 3:
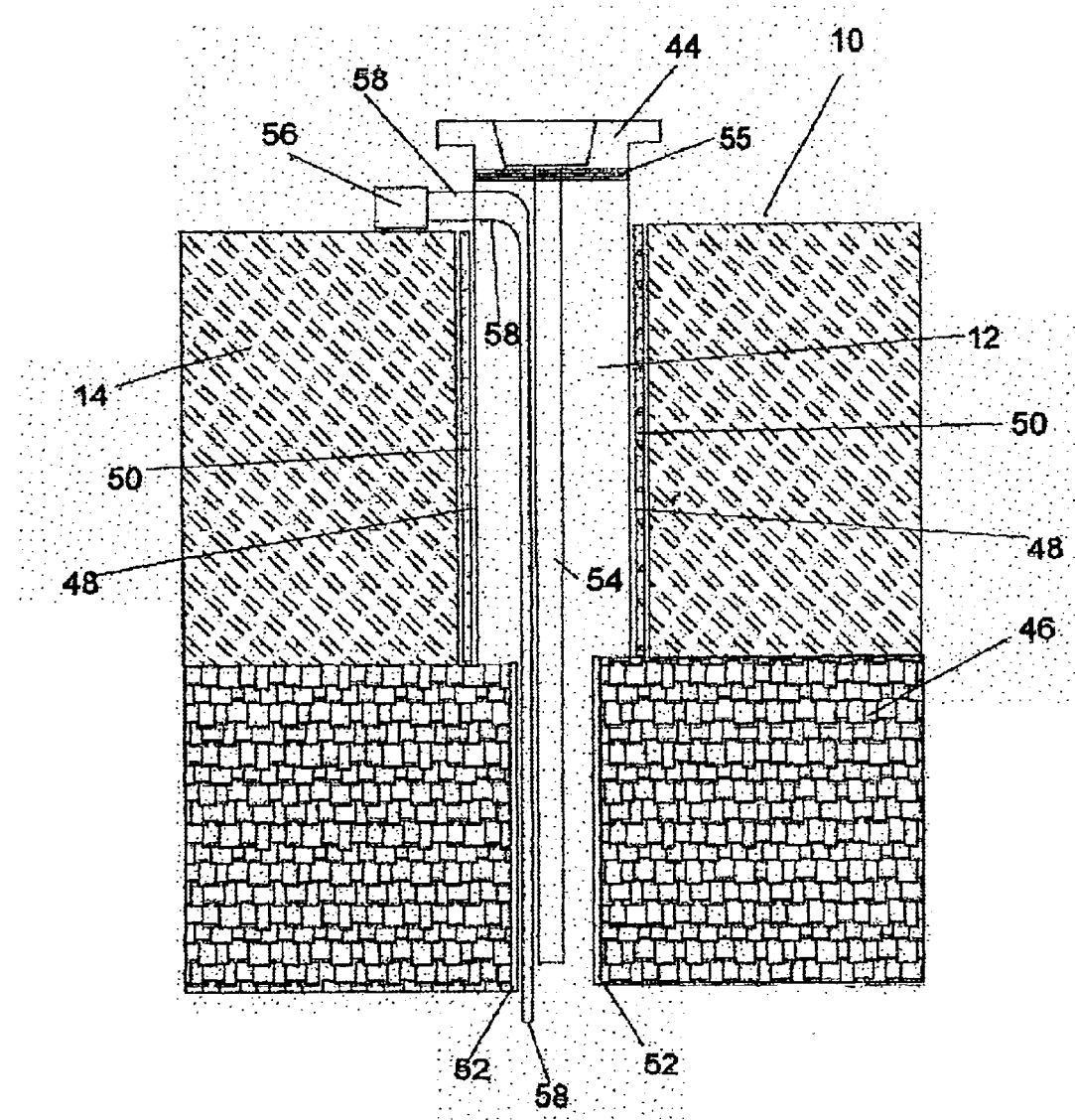
FIG. 3 is a schematic cross-sectional view of an oil well showing a first essential component to the present invention.

Attention is drawn to FIG. 3 showing some of the component parts of an oil well and illustrating a first important element of the present invention.

A well head 44 is set into the well bore 12 and provides support, control and registration for further operations in a manner well known in the art. The well bore 12 descends, through the surrounding surface rock 14, to the oil bearing formation 46. Intermediate casing 48 is provided on the walls of the well bore 12 and held in place against the surrounding surface rock 14 by concrete 50 which is driven in a slurry to be forced up the gaps between the intermediate casing 48 and the surrounding surface rock 14 and sets to keep the intermediate casing 48 in place.

A production liner 52, a perforated steel tube which allows ingress of oil, extends into the oil bearing formation 46. Production tubing 54 allows pumping of oil from the production line 54 towards the well head 44.

A surface control valve 55 can be opened to permit the flow of oil in the well bore 12 or closed to prevent the flow of oil in the well bore 12.

A fibre optic coupling station at the surface 10 provides a start and end point for a loop of high pressure tubing 58 which passes through the well to the bottom of the oil bearing formation 46 and returns to the fibre optic coupling station 56. As will later be illustrated, a continuous fibre optic line is driven through the loop of high pressure tubing 58 by water pressure to descend the bore 12 and to return to the surface. The continuous loop fibre optic in the high pressure tubing 58 is used to monitor temperature in the bore 12. Such use is explained, for example, in GB 2122337 and EP 0213872.

Figure 4:
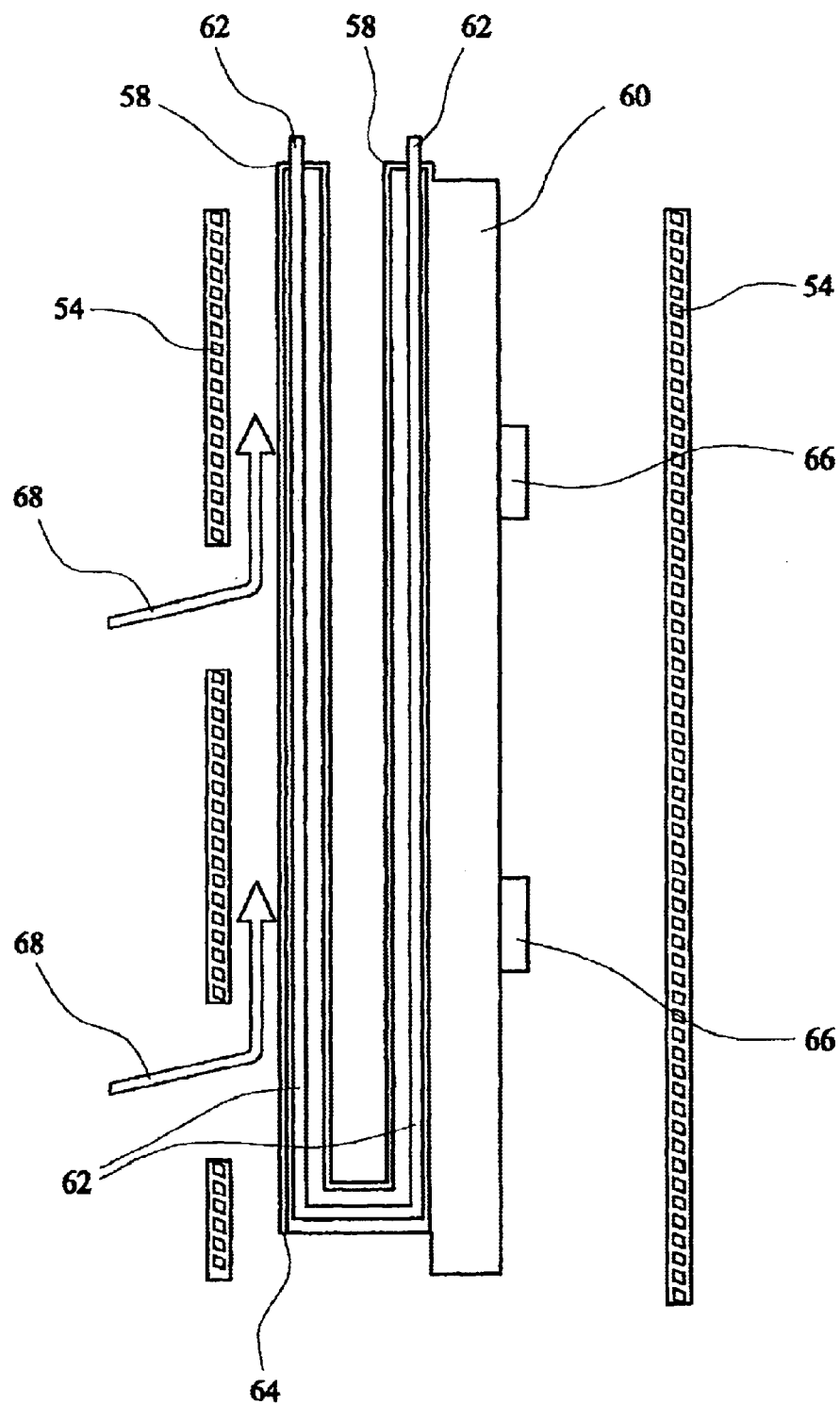
FIG. 4 is a schematic cross-sectional view of an oil well showing a second component, cooling stations, being part of the embodiment for the present invention.

Attention is drawn to FIG. 4 showing a schematic view of a cross section of an oil well illustrating further elements in the present invention.

The high pressure tubing 58 has a supporting "stinger", a small diameter tube which can be inserted into the production tubing 54, supporting the high pressure tubing 58 in its loop. The stinger 60 tubes are assembled at the surface 10 and lowered one by one, as an assembly, into the well bore 12 until the end of the loop of high pressure tubing 58 reaches the greatest depth, in the well bore 12, from which measurements are to be made. The fibre optic cable 62 is passed down the high pressure tubing 58 by passage of fluid, around the U-bend 64 at the bottom of the loop of high pressure tubing 58, and back to the fibre optic coupling station 56 at the surface 10.

Also supported on the stinger 60 are a plurality of cooling stations 66, positioned on the stinger 60 to intercept each flow 68 to be measured after its entry into the well bore 12 and before the entry of any other flow 68.

Figure 5:
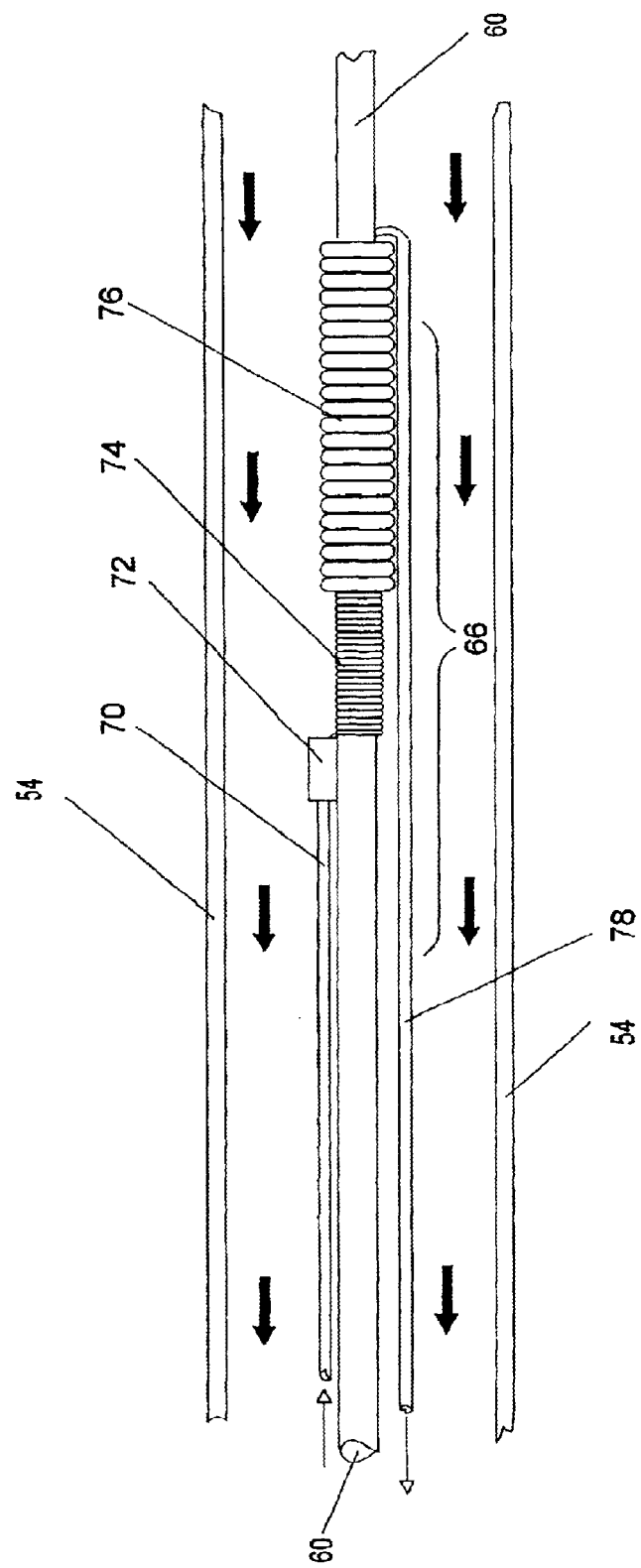
FIG. 5 is a view of a cooling station.

Attention is drawn to FIG. 5 showing details of the elements of a cooling station 66. The stinger 60 lies within the production tubing 54. A nitrogen supply line 70, bearing nitrogen, from the surface, under extremely high pressure, is attached to a pressure release valve 72, the nitrogen supply line 70 is pressurised below 6,500 lb per sq inch (45 MPa) when the valve 72 is shut. As soon as the pressure in the nitrogen supply line 70 exceeds 6,500 lb per sq inch (45 MPa), the valve 72 opens and allows fresh passage of high pressure nitrogen therethrough. From the valve 72, the high pressure nitrogen passes through a small diameter tubing throttle 74 wrapped around the stinger 60, in which the pressurised nitrogen undergoes Joule-Thompson cooling. Thereafter, the cooled nitrogen passes to a cooling coil 76 which cools the surrounding, passing oil. The spent nitrogen is then returned towards the surface in an exhaust line 78.

Figure 6:
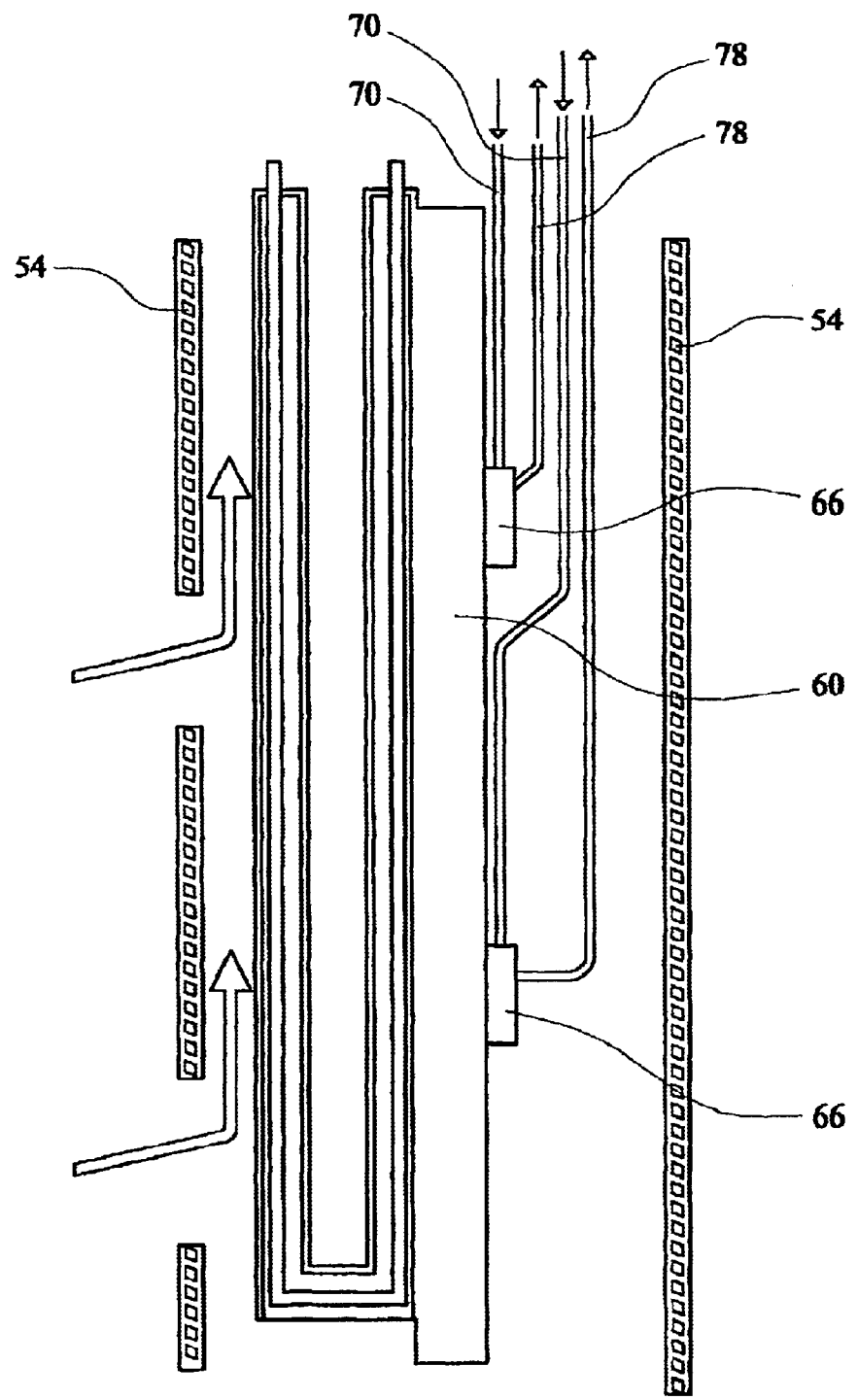
FIG. 6 shows a first method of supplying and exhausting high pressure nitrogen gas for the cooling stations.

Attention is drawn to FIG. 6 which shows one way in which the cooling stations 66, down the stinger 60, can be provided with high pressure nitrogen. In FIG. 6, each cooling station 66 is provided with its own nitrogen supply line 70 and its own exhaust line 78. The respective pairs of an exhaust line 78 and a supply line 70 are threaded, on the surface of the stinger 60, to the individual cooling stations 66.

Figure 7A:
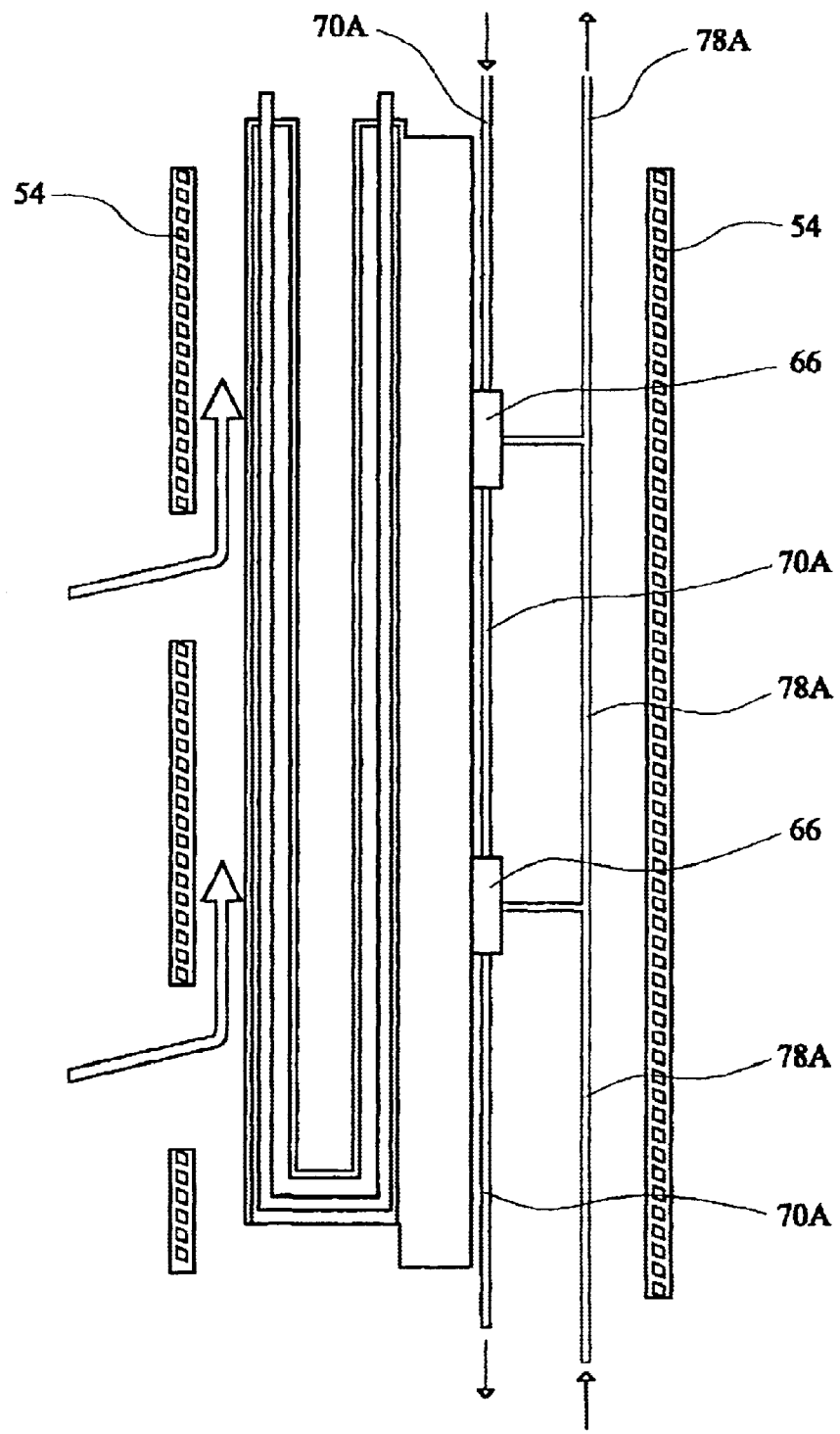
FIG. 7A illustrates a method of providing high pressure nitrogen to cooling stations from a common line and venting to a common exhaust line.

FIG. 7A shows another manner in which the cooling station 66 may be connected to the exhaust line 78 and the nitrogen supply line 70. Instead of having individual supply lines 70 and exhaust lines 78, the cooling stations 66 are connected to a common supply line 70A and a common exhaust line 78A. Whereas the arrangement shown in FIG. 6 permitted individual cooling stations 66 to operate, the arrangement shown in FIG. 7 causes all of the cooling stations 66 to operate simultaneously. As will be appreciated, all of the Figures showing an oil well are very much minimised in the longitudinal (vertical) direction. Individual cooling stations 66 may be many hundreds or thousands of feet apart. As will become clear from the following explanation of use, the present invention is completely functional even when all cooling stations 66 are simultaneously activated.

Figure 7B:
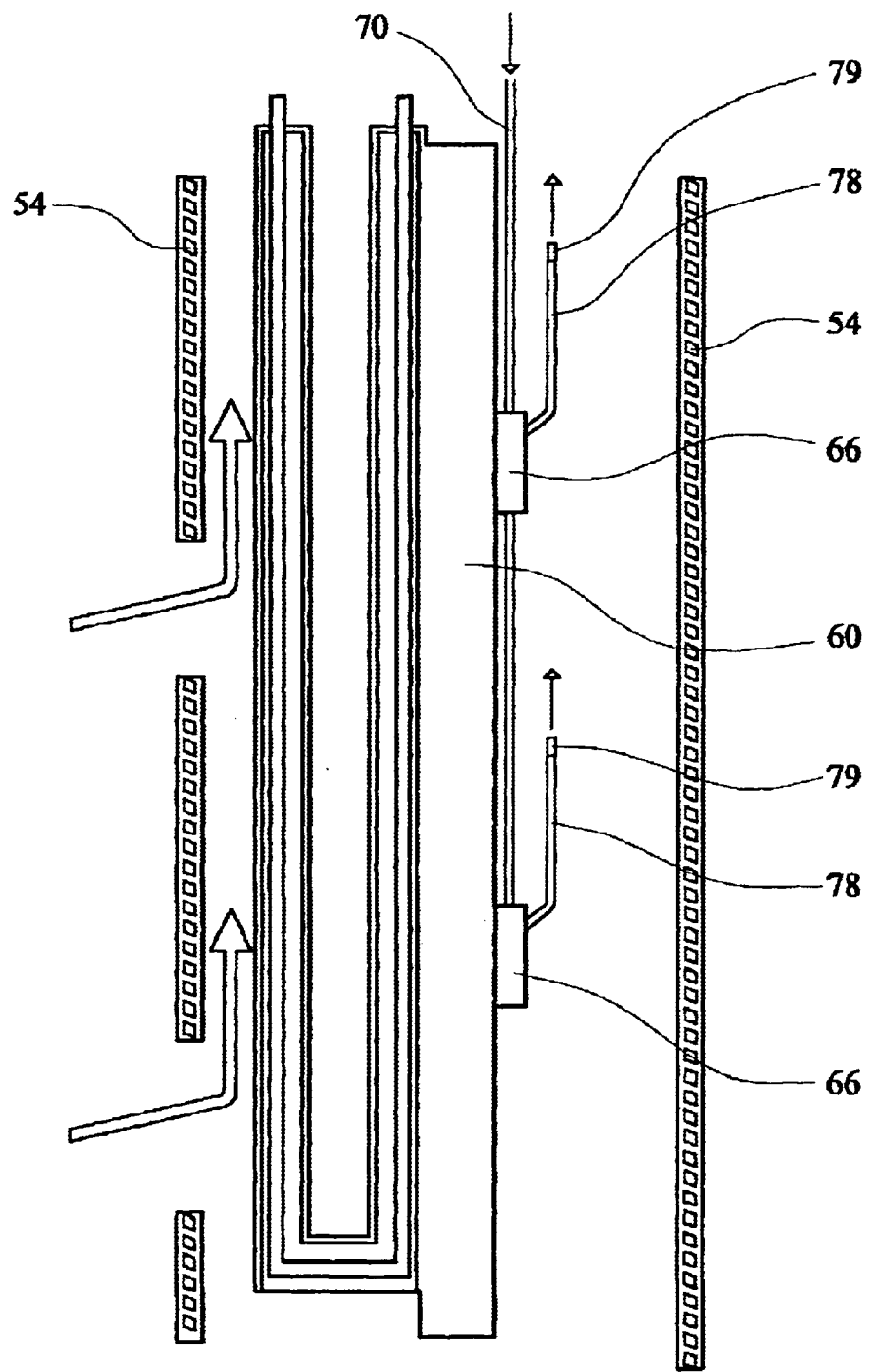
FIG. 7B shows an alternate venting arrangement to that shown in FIG. 7A.

FIG. 7B shows another manner in which the cooling stations 66 may be connected to the exhaust line 78 and the nitrogen supply line 70. A common supply line 70A is provided. Instead of having a common return line 78A, each cooling station 66 has its own truncated return line 78C capped, for preference, by a non-return valve 79 which prevents ingress of oil into the truncated return line 78C. This arrangement has the advantage that each of the cooling stations 66, being vented by the same length of truncated return line 78, is more balanced in its performance with the other cooling stations 66 in the well bore 12.

As an alternative, not shown in FIG. 6, FIG. 7A or FIG. 7B, the exhaust line 78A may be omitted and the nitrogen, having passed through the cooling coil 76, can be vented directly into the surrounding oil in the production tubing 54. The arrangements of FIG. 6 and FIG. 7 are preferred however since this does not contaminate the oil, even with inert gas and does not introduce gas into the immediate vicinity of the cooling station 66.

Figure 8A:
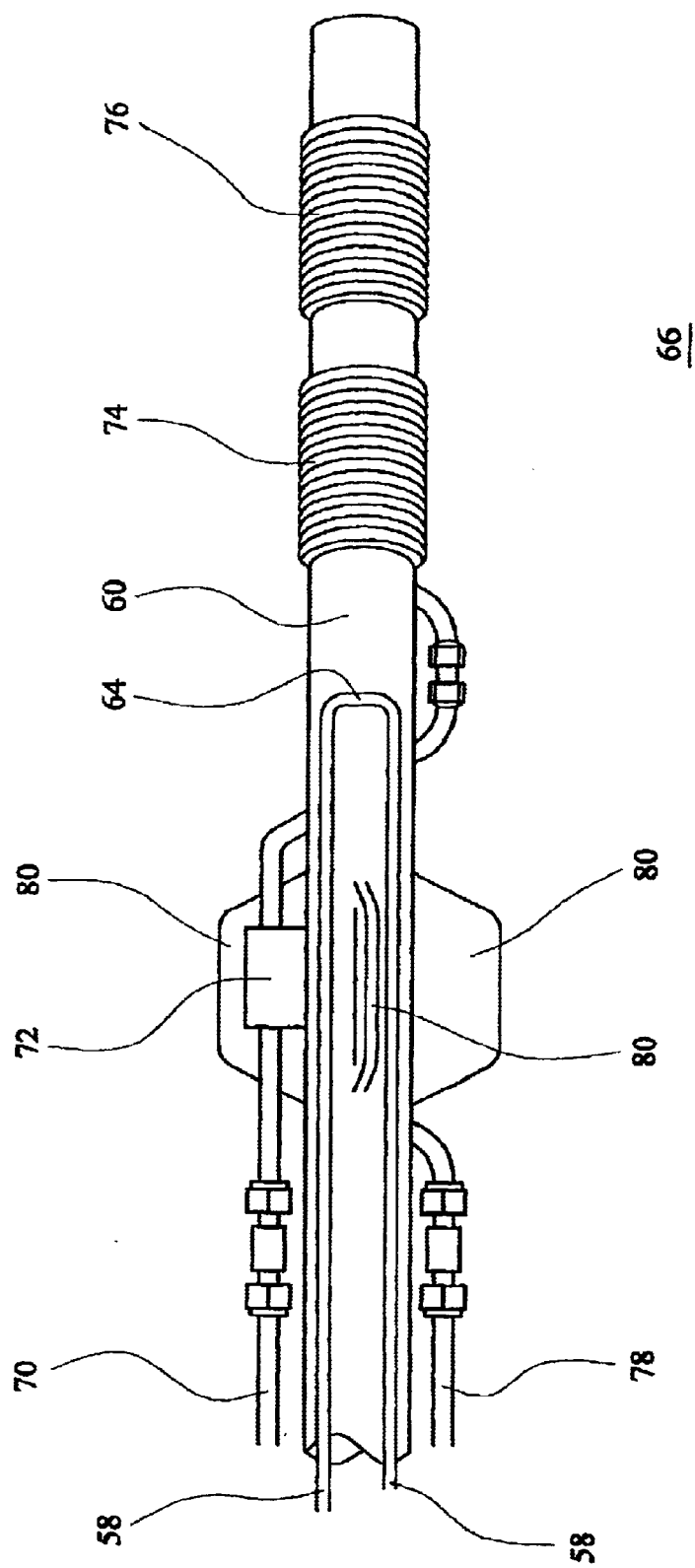
FIG. 8A is a sketch of a cooling station, as actually implemented in a practical example.

FIG. 8A is a sketch of a real life implementation of a cooling station 66 that has actually been tested. All of the numbers refer to the same elements as in the other Figures. The cooling coil 36 and the throttle 74 are simply lengths of tubing wound on the stinger 60. The cooling coil is ⅜" (9.5 mm) diameter tubing and the throttle is ⅛" (3.1 mm) diameter tubing. The pressure release valve 72 is simply in series therewith. It is to be noted that the stinger 60 comprises four fins 80 which space it from and hold it central within the wall of the production tubing 54. The fibre optic line passes through the high pressure tubing 58, which is here shown terminating on this particular stinger 60 with its U-bend 64 on the cylindrical surface of the stinger 60. The various lines 70 78 58 are simply clamped to the cylindrical surface of the stinger 60 by any means which will hold them in place. To give an idea of the scale, the diameter of the cylindrical body of the stinger 60 is only 4.8 cm (1.9 in). The cross section presented within the production tubing 54 is small enough not to represent a significant impedance to the flow of oil.

Figure 8B:
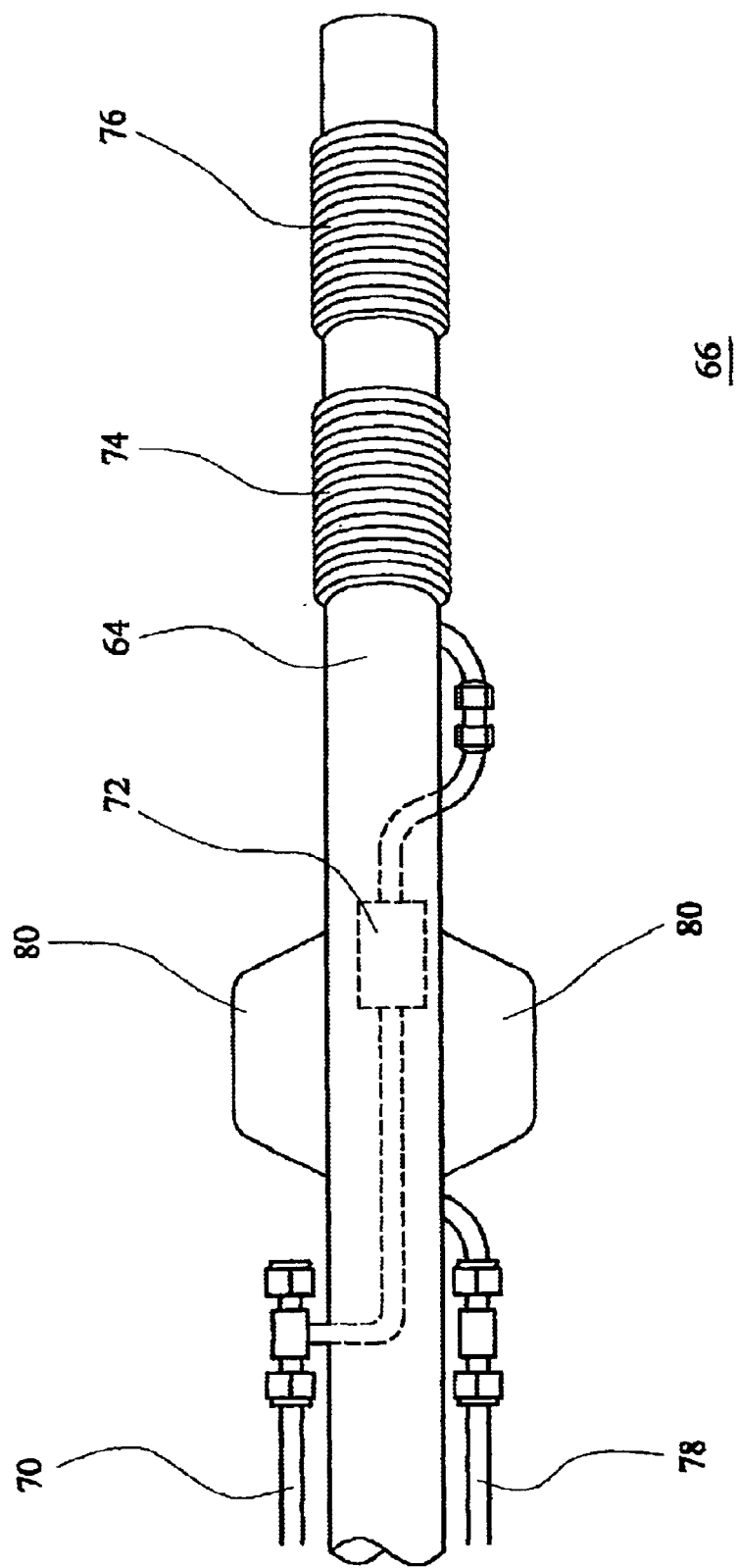
FIG. 8B is the sketch of FIG. 8A, but showing an alternative embodiment where the pressure release valve is housed within a stinger.

FIG. 8B shows another, preferred embodiment, similar to FIG. 8A but with one of the fins 80 and the high pressured tubing 58 omitted for clarity. In this embodiment, the pressure release valve 72 is housed within the stinger 60. This embodiment presents a lower cross-sectional area for the entire stinger 60 assembly, and protects the pressure release valve 72. In FIG. 8A, the pressure release valve 72 is shown protected by the fins 80. Increased protection for the pressure release valve 72 is found in FIG. 8B, the pipes to and from the pressure release valve 72 passing through the wall of the cylindrical section of the stinger 60.

Figure 9:
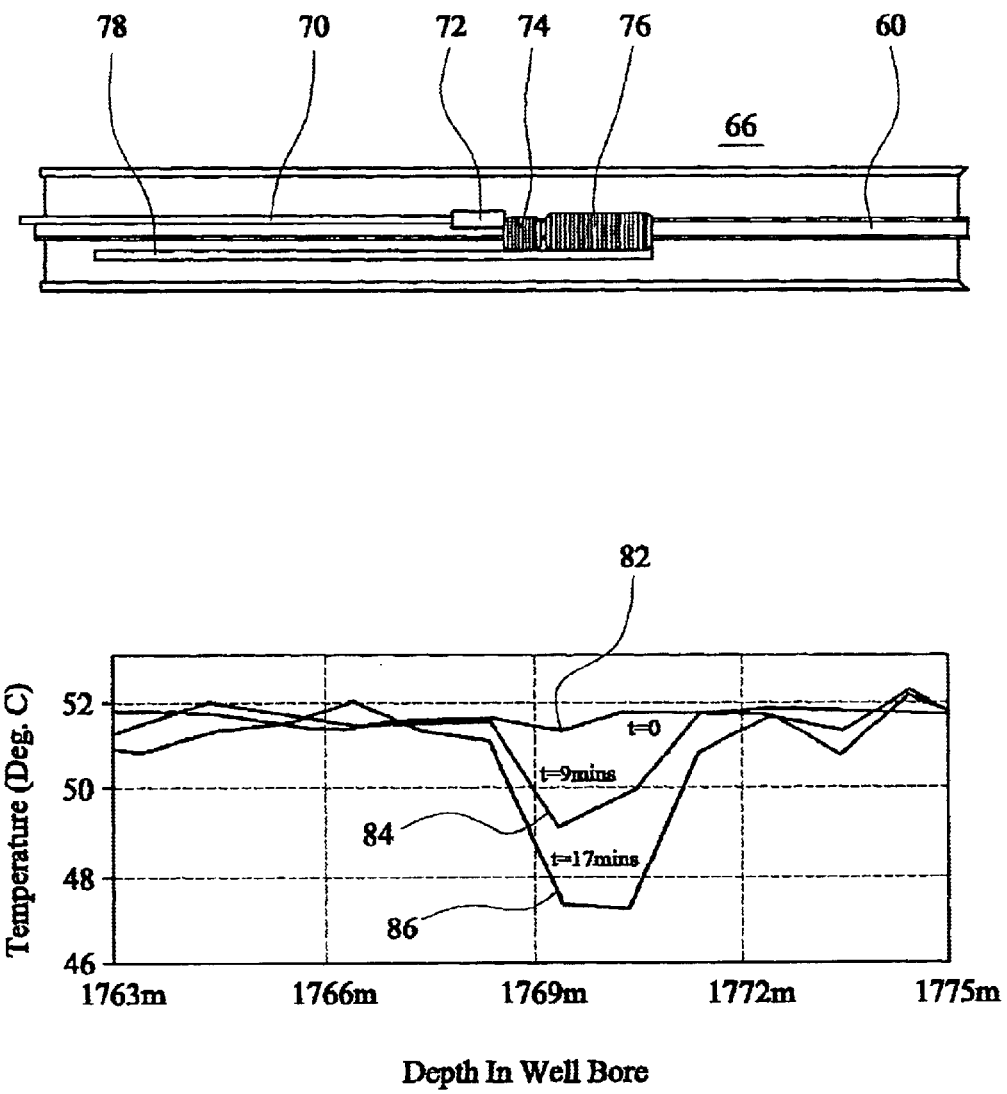
FIG. 9 shows the effect of prolonged cooling in a well bore when the oil is not flowing.

Attention is drawn to FIG. 9, a graph showing the effect, over time, of the cooling station 66 in a well bore when high pressure nitrogen is vented through the pressure release valve 72, the throttle 74, and the cooling coil 76. The horizontal extent of the graph is shown, for size comparison, against the real size of a cooling station 66. A first curve 82 shows the temperature profile around the cooling station 66 at the start of the cooling process. The reservoir temperature (the ambient temperature at that depth) is around 51 Degrees Celsius. A second curve 84 is the temperature profile around the cooling station 66 nine minutes after the first curve 82. A full 2 Degrees Celsius temperature drop has been achieved. A third curve 86 shows the temperature profile around the cooling station 66 seventeen minutes after the first curve 82 and eight minutes after the second curve 84. As can be seen, after just seventeen minutes of cooling, a temperature drop of 4 Degrees Celsius has been achieved.

The measurements, shown in FIG. 9, were taken in a well bore with the main flow from the well bore shut off. The present intention is intended mainly for use with measurements under constant flow, but also with a stop-start process.

Figure 10A:
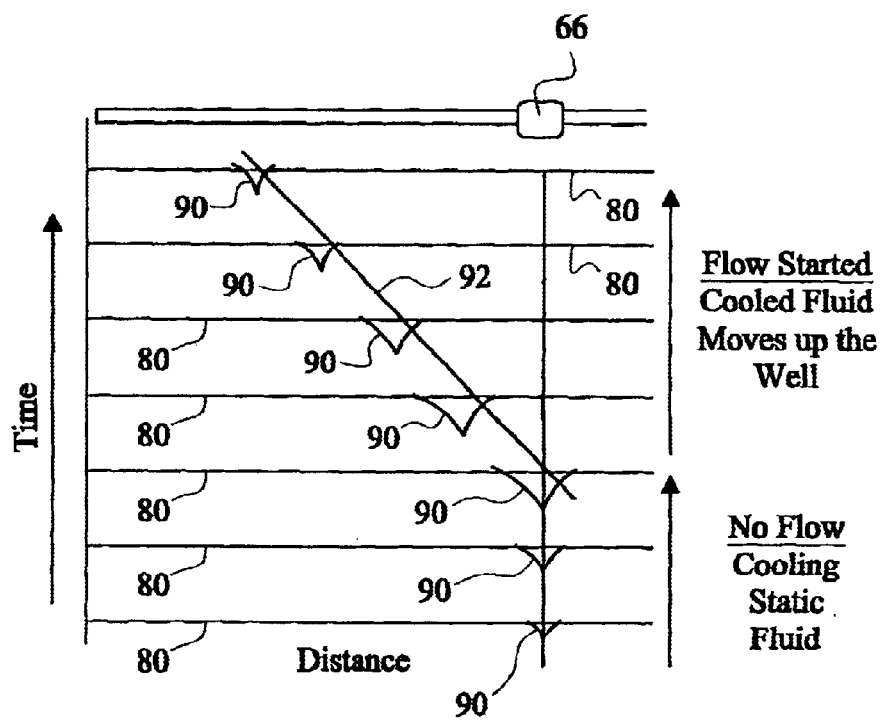
FIGS. 10A and 10B are graphs illustrating how temperature spikes, generated as shown in FIG. 9 and when the fluid is flowing, move along the well bore.

FIG. 10A shows a series of graphs illustrating what happens when the oil in the well bore 12 is started to flow. Each horizontal axis 80, in the depth direction, carries a graph of the temperature spike 90 as the oil is first cooled during a no flow period and then the cooled oil moves away from the cooling station 66. Each of the graphs on the horizontal axis 80 is effectively the graph of FIG. 9, but taken some time afterwards and with the exception that the oil is flowing in the well bore 12. As the oil flows, the height of the temperature spike 90 steadily decreases. The oil, having been cooled when the oil was not flowing in the well bore 12, now moves away from the cooling station 66 and carries with it the cold oil which was cooled down during a period of cooling. The gradient line 92 indicates the rate of flow of the oil in the well bore 12. In other words, the temperature spike 90 moves along the well bore and is detected by the fibre optic cable 62 in a series of spaced measurements. The fibre optic cable 62 is capable of knowing at what distance along its length a particular temperature exists. As the temperature spike 90 carried by the slug of cooled oil moves away from the cooling station 66, so it begins to be warmed through the walls of the production tubing 54 and the temperature spike steadily decreases in size.

Figure 10B:
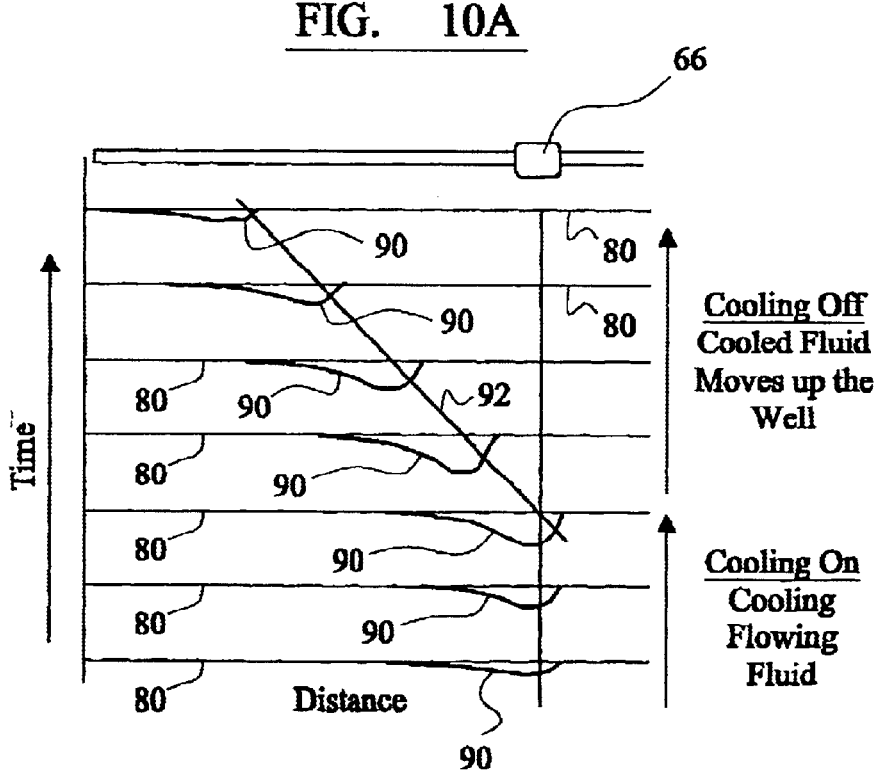

FIG. 10B is a suitable set of graphs to those of FIG. 10A, showing the response when the cooling station 66 is switched on whilst the well is flowing. In this case the amount of cooling is less because heat is carried up the well by the flowing fluid—typically 0.5–1.0 Degrees Centigrade. However, when the cooling element 66 is switched off, the cooled slug of fluid moves up the well in the same manner as with FIG. 10A. In this case, a number of temperature measurements at different depths are required in order to statistically resolve the small temperature changes produced in the well flowing measurement.

Figure 11:
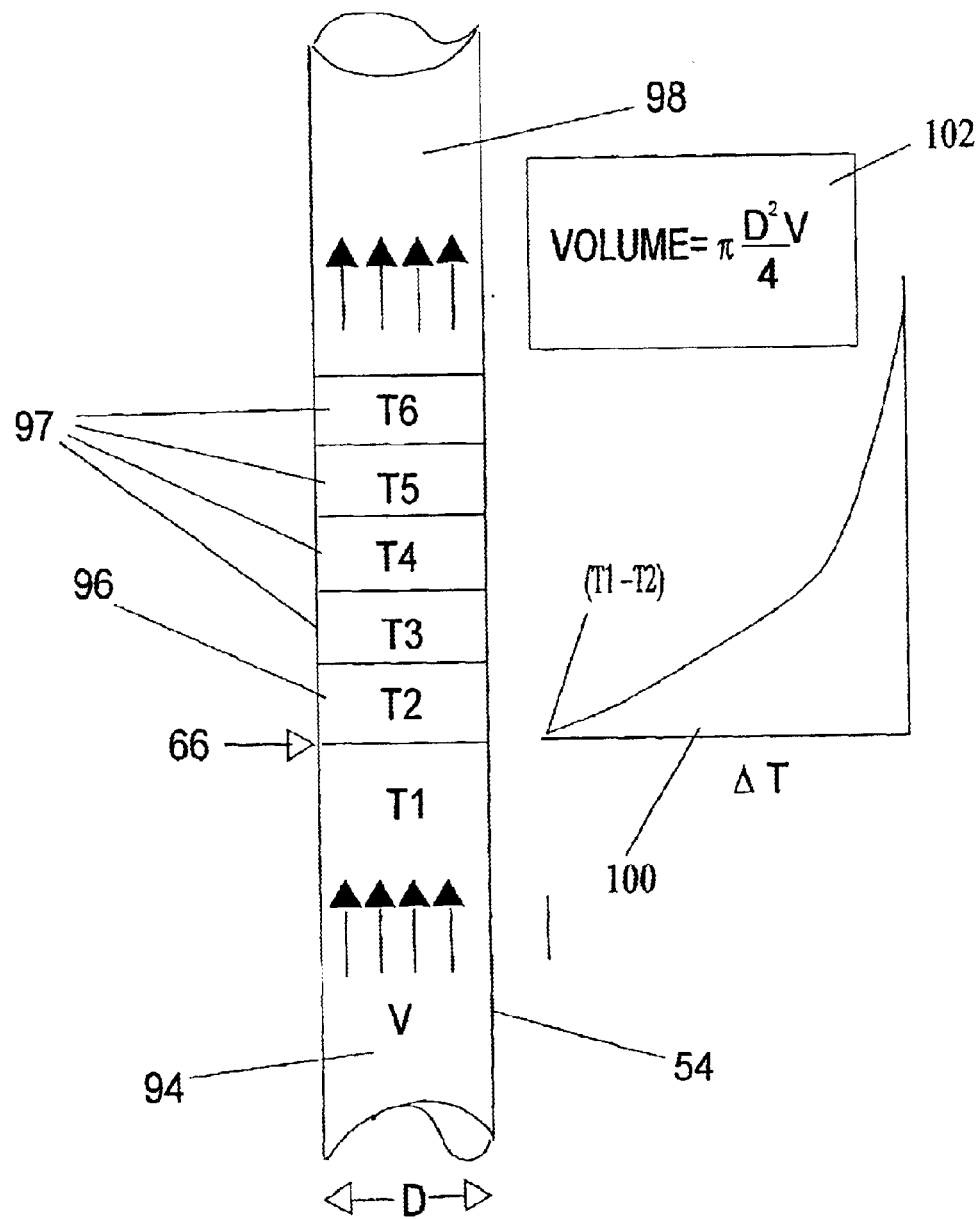
FIG. 11 shows the basis for calculation of the volume rate of flow through the well bore and illustrates the various zones and temperatures and their cooling characteristics.

FIG. 11 is a schematic diagram of oil flowing in the production tubing 54 illustrating the manner in which the rate of flow of oil is measured and the manner in which the temperature differential of the spike 90 decays.

In the first region 94 the oil, not having yet encountered the cooling station 66, moves with a velocity V. The internal diameter of the production tubing 54 is D. In the first region 94 the oil has a temperature, reflecting the temperature of the ambience surrounding rock, of T1. The cooling station 66 is located at the termination of the first region 94. The cooling station 66 cools the oil to a lower temperature T2 in a second region 96. In subsequent regions 97 the oil begins to warm as it continues up the well bore 12 heat being transferred from the production tubing 54 to the oil by conduction. The oil warms through successive temperatures T3 to T6, where T6 approximates to the local reservoir temperature which may or may not be the same as T1. The associated graph 100, with the vertical axis in the same scale as the distance along the production tubing 54, shows how the initial temperature drop decays, exponentially with distance along the production tubing 54, and subsequently with time. The calculation box 102 shows this formula by which the volume of oil per second, moving along the production tubing, is calculated.

Figure 12:
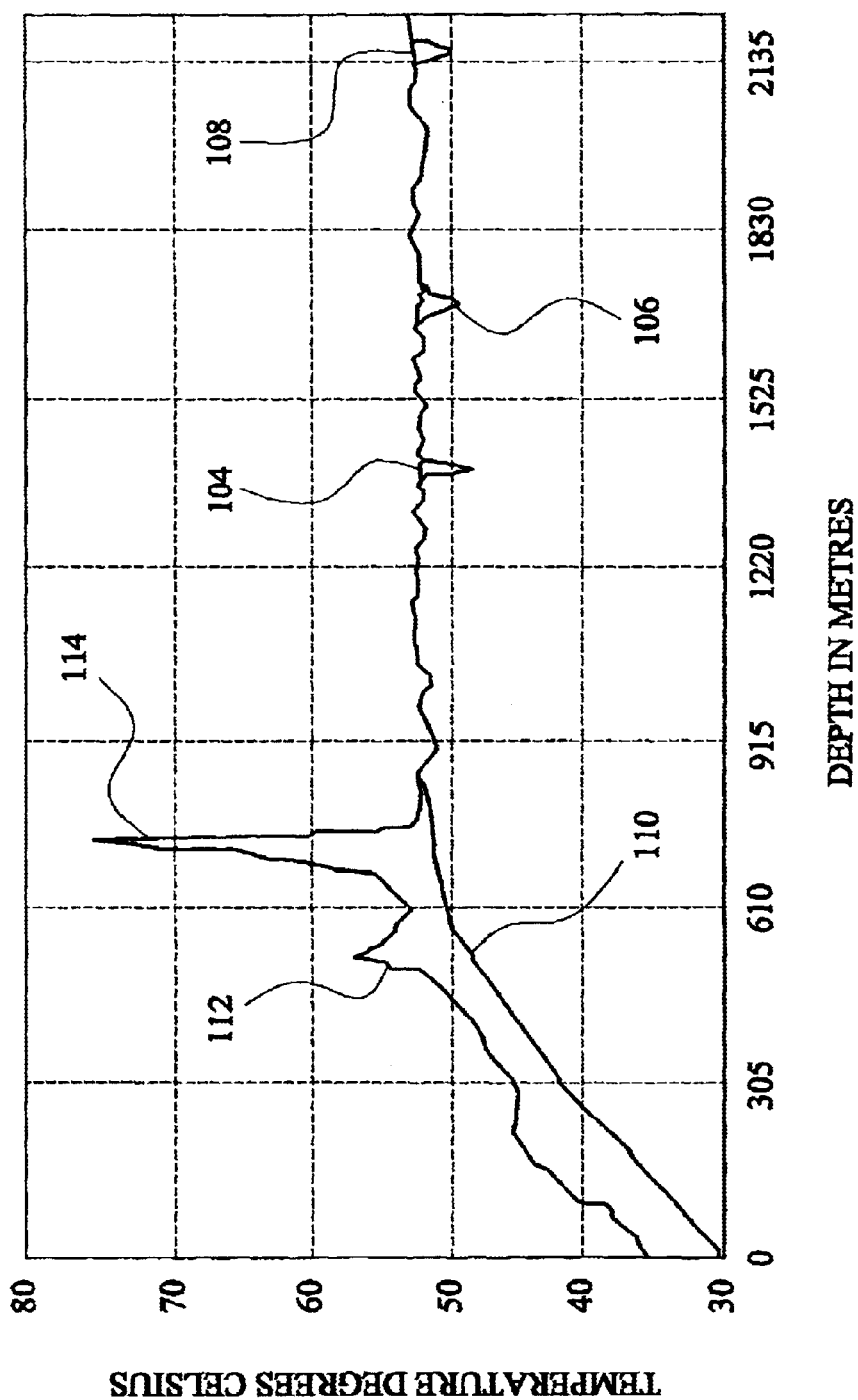
FIG. 12 is an actual graph of the temperature and depth response of a three cooling station well.

Attention is drawn to FIG. 12 showing a typical temperature measurement down an oil well, the temperature in degrees Celsius being shown against depth in the well.

The pressure release valves 72 are designed to open when the pressure in the nitrogen supply line 70 exceeds 6,500 psi (45 MPa). The example shown, in FIG. 12, illustrates a well where three cooling stations 66 have been placed. With the well not flowing, a lower curve 110 is obtained which includes the temperature anomalies caused by injecting high pressure gas through the 3 cooling coils. A first temperature drop 104 shows the location of the uppermost of the cooling stations 66. A second temperature drop 106 shows the location of a middle cooling station 66. A third temperature drop 108 shows the location of the lowest of the three cooling stations 66. When the well has been flowing for sixteen hours, an upper curve 112 is obtained which, beyond a heating spike 114, caused by the presence of a down-well pump, matches the lower curve 110 in the value of its ambient down-well temperature.

Figure 13:
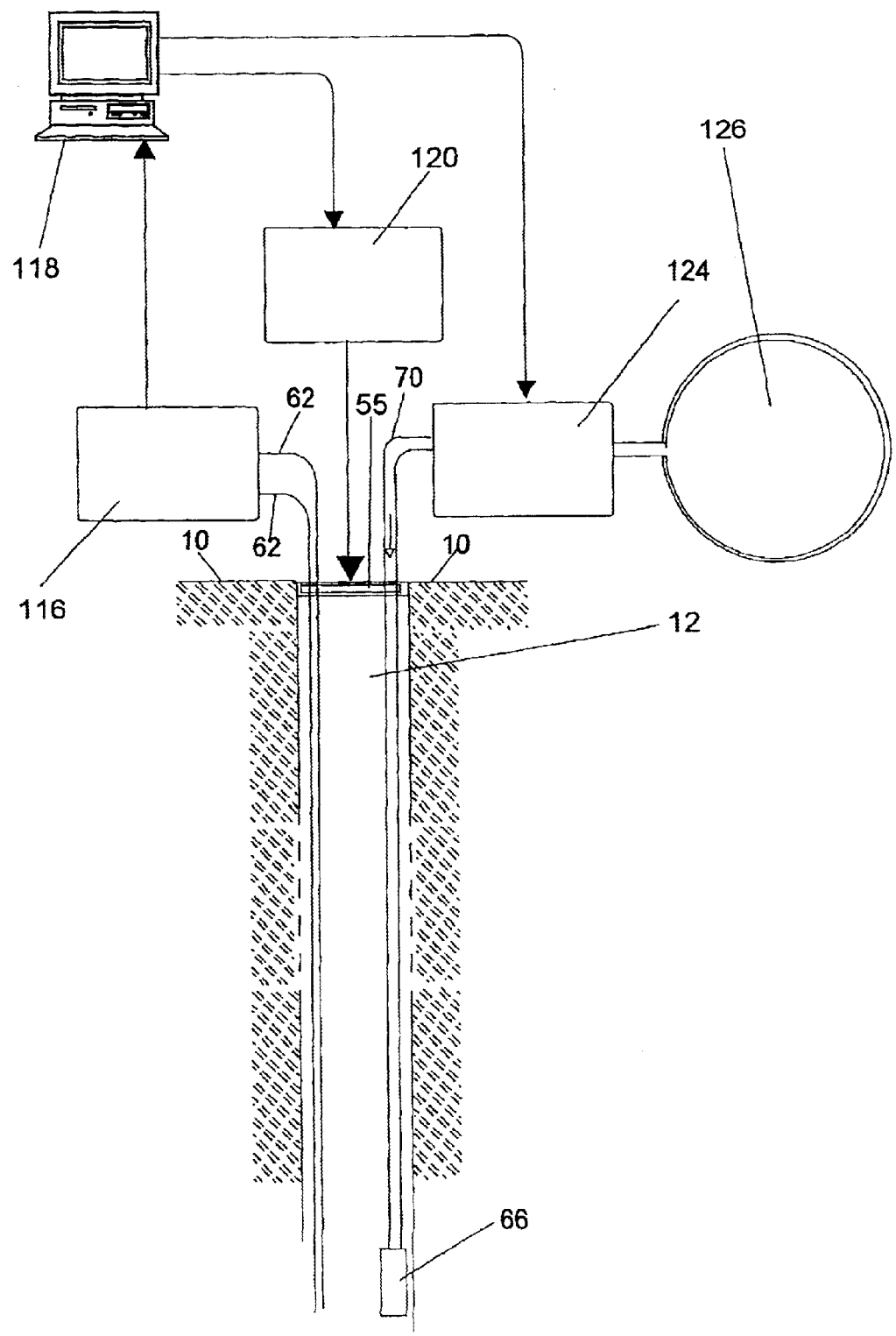
FIG. 13 is a schematic view of the elements required to operate the present invention.

Attention is drawn to FIG. 13 showing a possible control set-up which could be used with the present invention. At the surface 10 of the well bore 12 the fibre optic coupling station 56 feeds the two fibre optic cables 62 into an analyser 116 which feeds depth and temperature information to a controller 118. The controller 118 in turn provides operational commands to a valve controller 120 which selectably operates the surface valve 55 which is situated in the top of the well bore 12, above all sources of supply of oil to the well bore 12. The controller 118 also provides commands and instructions to a nitrogen supply module 124 which is selectably operable to provide nitrogen, from a high pressure nitrogen reservoir 126 to the nitrogen supply line 70 feeding a cooling station 66 in the well bore 12.

Figure 14:
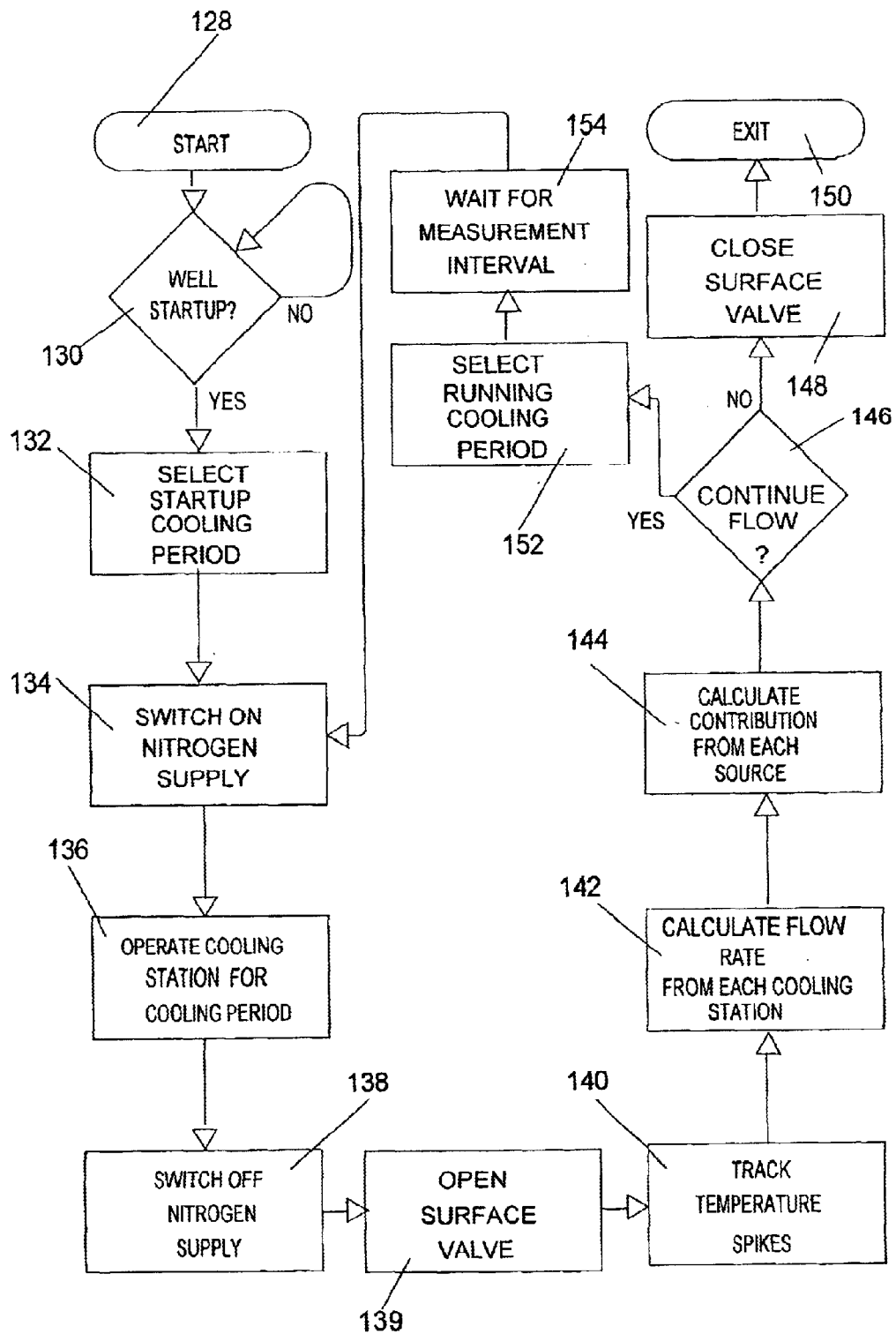
FIG. 14 is a flow chart of the activities of the controller shown in FIG. 13.

Attention is now drawn to FIG. 14, showing a flow chart of the activities of the controller 118 when conducting flow rate measurements based on the actual manual process used in current installations.

From a start 128 a first test 130 awaits a well start-up command. It is presumed that the well is switched off. If a well start-up command is received, a first operation 132 selects a start-up cooling period to be used in the well when the oil is not flowing. In the preferred embodiment of the present invention, the start-up cooling period is selected to be in the region of twenty minutes. It is to be appreciated that the cooling period can be greater or lesser than this dependently upon the sensitivity of the temperature measuring apparatus, and dependently upon the degree of cooling which is required.

Thereafter, a second operation 134 causes the nitrogen supply module 124 to supply nitrogen to the cooling station 66 or cooling stations 66 in the well bore 12. The pressure of the nitrogen supplied is above the pressure for opening the pressure release valve 72 so that the cooling stations 66 begin to cool the surrounding oil in the well bore 12. A third operation 136 maintains the supply of nitrogen to pass through the cooling station 66 for the selected cooling period. At the end of the third operation 136, a fourth operation 138 switches off the nitrogen supply to the cooling stations 66 terminating the cooling epoch. A starting operation 139 opens the surface valve 55 so that the well starts flowing. The controller 118 then tracks the temperature spikes 90 in a fifth operation 140. By using measurement intervals of one metre and taking temperature samples every twenty-five seconds, the controller 118, receiving data from the analyser 116, and acting as a timer to time the difference of arrival of the temperature spikes 90 at different points, knows the linear rate of flow of oil departing from each cooling station 66. A sixth operation 142 then calculates the volume rate of flow past each cooling station 66 and a seventh operation 144 calculates the volume flow contribution from each source feeding the well bore 12.

A second test 146 determines whether or not the temperature measurement run is a simple static test or whether production is to continue. If the second test 146 detects that production is not to continue, an eighth operation 148 causes the valve controller 122 to close the surface valve 55 and goes to an exit 150. The results obtained are exemplary of those shown in FIG. 10A.

If the second test 146 detects that the measurement operation is to be done over a production run, a ninth operation 152 selects the cooling period to be used while the production is running. The cooling period to be used when oil production is running can be the same as the start-up cooling period or can be shorter or longer depending upon the measurements requirements. For example, a shorter running period will give a smaller temperature drop. A longer running period will give a greater temperature drop. The initial start-up cooling period, while the oil was not running in the well bore 12, gives a cold slug of oil whose progress along the well bore 12 can be measured to give a first idea of the flow rate of the oil in the well bore 12. The ninth operation 152 can select the cooling period to be used while the well bore 12 is producing oil, dependently upon the initially measured rate of flow of oil. The faster the oil flows, the longer must be the cooling period for the minimum measurable temperature drop to be established.

The ninth operation 152 then passes on to a tenth operation 154 during which all operation of the cooling stations 66 is suspended for the measurement interval. The measurement interval is the period of time between flow rate tracking measurements. In a fast-running well, this can be just a few minutes. In a slow-running well, the measurement interval can be much longer. The tenth operation 154 can select the measurement interval dependently upon the observed temperature fall and the initially measured flow rate in the well bore 12.

The tenth operation 154 then passes control back to the second operation 134 which switches on the nitrogen supply to start the cooling process over again by producing another set of temperature spikes 90 which can be tracked in the manner shown in FIG. 10.

The controller 118 thus continues making flow rate calculations, based on the movement of cold slugs of oil, at repeated measurement intervals until the second test 146 detects that the production run is over. The results obtained are exemplary of FIG. 10B.

Figure 15:
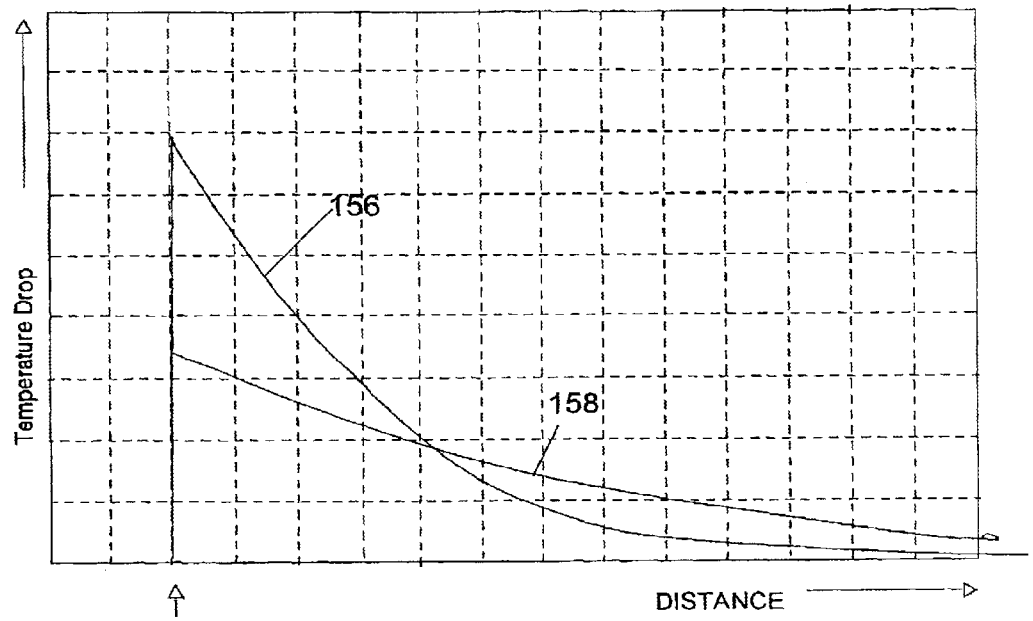
FIG. 15 is a graph of the temperature versus distance, with the cooling station operating, in a steadily flowing oil well.

Attention is drawn to FIG. 15 which illustrates the process of tracking the temperature spikes undertaken in the fifth operation 140.

FIG. 15 is a graph of the steady state conditions, with the cooling stations 66 operative, reached in the well bore 12.

The cooling station 66 creates a temperature drop in the oil flowing past. The fourth curve 156 shows the situation where the oil is flowing at a first velocity. The oil cools down steadily with time, and the distance moved by the oil is proportional to time. A fifth curve 158 shows what happens when the oil is moving more quickly. The fifth curve 158 has the oil moving twice as quickly as for the fourth curve 156. The initial temperature drop is only half as high in the fifth curve 158 as it is in the fourth curve 156. However, because the oil is flowing twice as quickly, the distance factor is also multiplied by two, so that, beyond a critical distance, the fifth curve 158 exceeds the value of the fourth curve 156. The cooling with distance curves shown in FIG. 15 are the basis for the following Figures.

Figure 16:
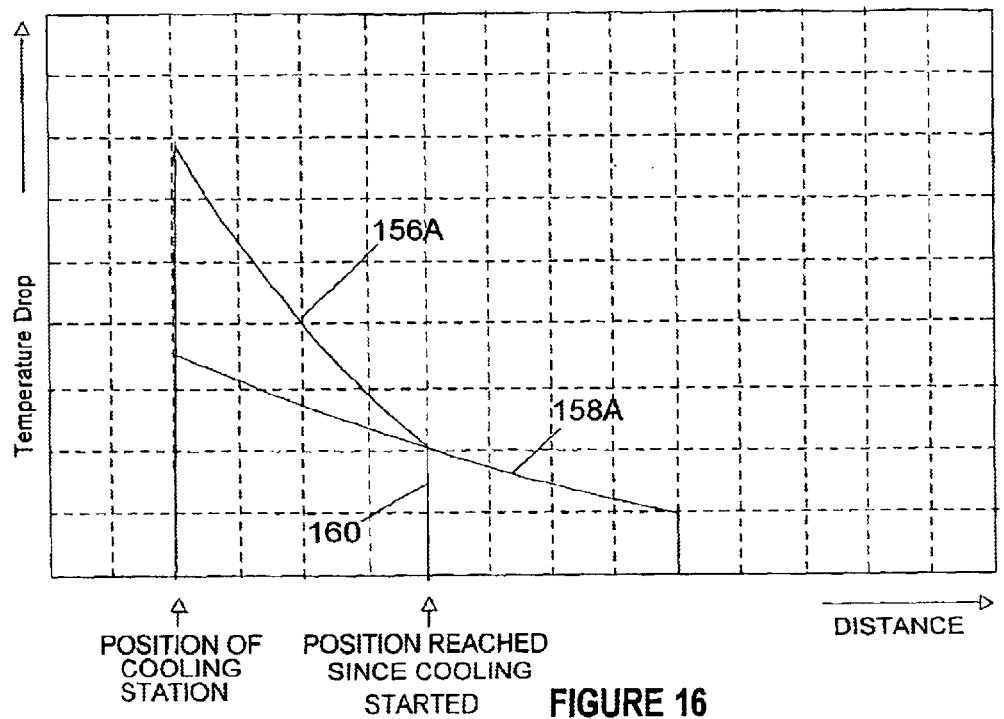
FIG. 16 is a graph showing the initial stage where a cooling operation is commenced in the well bore with the oil flowing.

Attention is drawn to FIG. 16 which shows the situation, while the oil is flowing, which occurs when the cooling station 66 is switched on. In a first example, where the oil is flowing at the slower velocity, a "slug" of cooled oil has the temperature gradient with distance shown by curve 156A. There is a sharp transition 160 to the fourth curve 156 at the point where the flowing oil has reached since the cooling started.

The slug of cooled oil, whose temperature profile is shown by the curve 158A, is exemplary of the oil having double the velocity to that illustrated by curve 156A. In this instance, the cooled slug of oil has progressed twice the distance as the slug of oil illustrated by curve 156A.

Figure 17:
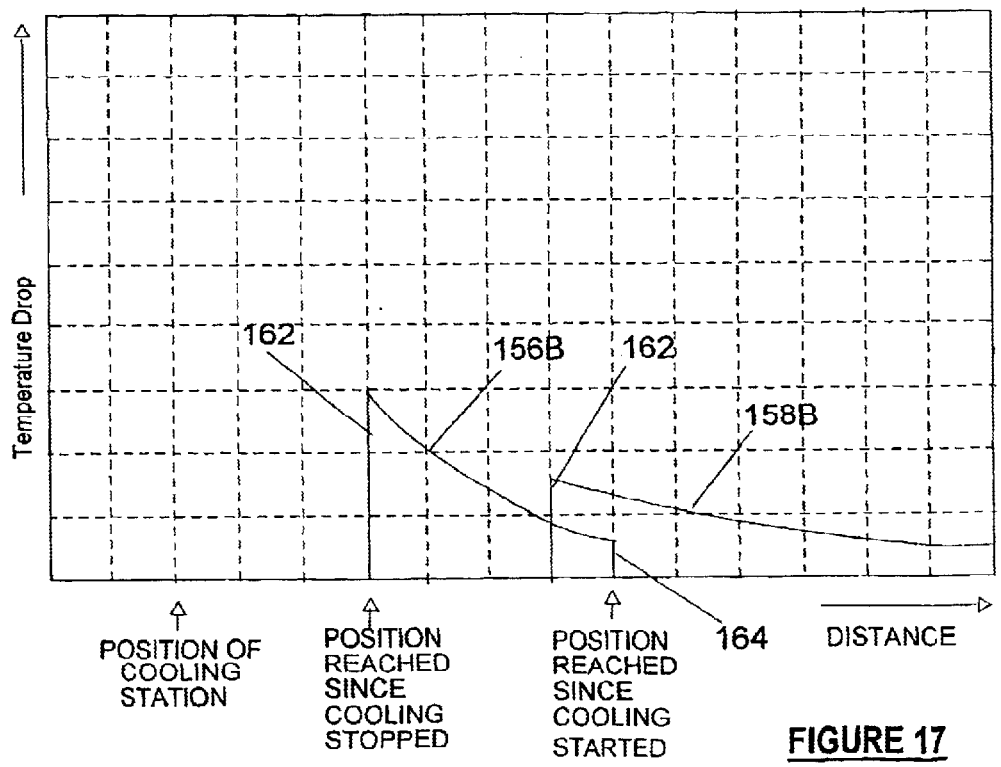
FIG. 17 is a graph showing the effect of cessation of a cooling operation in a well bore with the oil steadily flowing.

Attention is drawn to FIG. 17. Here, the cooling has been switched off and the oil continues to flow. The slug of oil, at the slower velocity, is exemplified by curve 156B. The temperature of each part, as it moves along the well bore 12, follows the exponential temperature difference curve 156 shown in FIG. 15. Had the oil been flowing at double the rate illustrated by 156B, curve 158B would have been the result. It, too, represents a slug of oil which cools, as it moves along the well bore 12 according to the exponential temperature difference curve 158 shown in FIG. 15.

FIG. 17 shows that trailing edge 162 of a slug of cooled oil, when the cooling operation is applied while the oil is flowing, is very much more prominent in its temperature drop signature than the trailing edge 162.

In the fifth operation 140, when the flow of oil has been established and the well bore 12 is in constant production, for the reasons illustrated in FIGS. 15, 16 and 17, more easily tracks the trailing edge 162 of the cooled slug of oil in each instance. Nonetheless, the leading edge 164 and the main body of the cooled slug of oil can also be tracked.

After the start-up cooling period, which is sufficient to allow the static oil to reach close to its maximum temperature drop, the surface valve 55 is opened, a down-well pump 122 is switched on and the oil begins to move. As time passes, the originally static primary cooling spike 166 becomes a moving temperature spike 168. It is to be observed that its amplitude decreases in accordance with the exponential cooling decay curve 156 of FIG. 15. The further the moving spike 168 moves along the well bore 12 the smaller it gets. In this instance, of the initial start-up flow measurement, the rate of flow of oil can be tracked by the fifth operation 140 monitoring either or both of the leading edges 164 and the trailing edges 162, since both, in this instance, are equally well defined.

Figure 18:
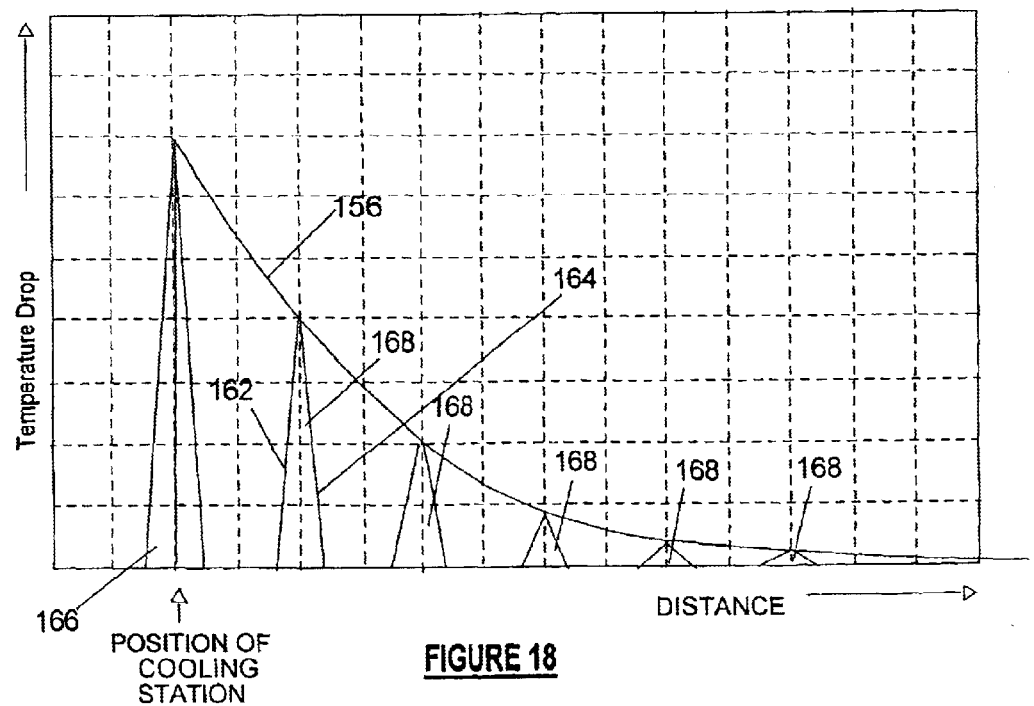
FIG. 18 is a graph showing the movement of a temperature spike, otherwise shown in FIG. 9, as the well bore changes from a non-flowing to a flowing situation.

Attention is drawn to FIG. 18. FIG. 18 illustrates the situation which happens at the start-up cooling period selected by the first operation 132 of FIG. 14. The oil is not flowing. The cooling station 66 is switched on. A primary cooling spike 166 is built up, as illustrated by FIG. 9, in the vicinity of the cooling station 66.

Figure 19:
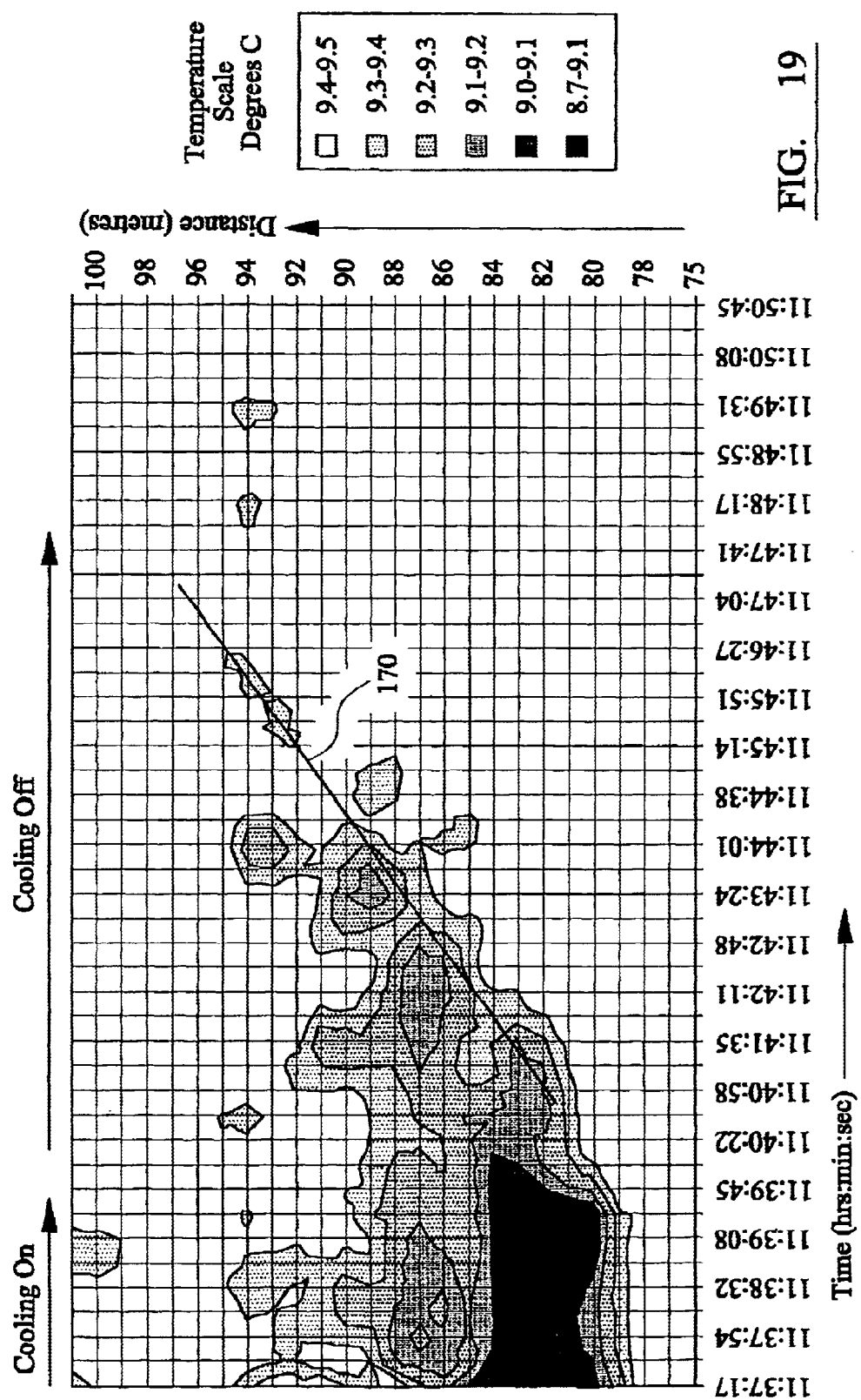
FIG. 19 is a graph of actual data recorded as the cooling element is switched off and flow carries the cooled fluid downstream.

Attention is drawn to FIG. 19. FIG. 19 is an actual graph of real data recorded in a water test flow loop where the water has been cooled by the cooling coil and the cooling is then stopped. The flow of fluid up the well carries the warm/cold interface up the well and the slope of track of the interface in both depth and time, as exemplified by a slope line 170, can be converted into a fluid velocity. The plot demonstrates the warming of the fluid upstream of the cooling coil both when the cooling is taking place and once it is switched off.

It is to be appreciated that the present invention is also operative to measure reverse flow in the oil well. Some flow sources may be reversed if the pressure of other flow sources is excessive within the well.

While the invention has been described with reference to an oil production well 12, the invention can be applied to any fluid, such as water or gas, flowing in any conduit, such as a water main, open channel or a gas pipeline. The invention has been described with reference to a Joule-Thompson effect cooling station 66. It is to be appreciated that the invention can have any kind of heat exchanger to alter the temperature of the fluid, such as electrical refrigerators or heaters either heating the fluid directly by a heat exchanger, as with the gas cooling described herein, or by ejecting a suitably preheated slug of fluid into the well bore. The fluid can be heated or can be cooled to create a moveable slug of fluid whose progress can be tracked. The heat exchanger can be electrically or chemically driven. The present invention has been shown as utilising a surface valve 122 as a flow arrester by being switched off. The invention can also use any type of flow arrester which can achieve this purpose. The invention has been described using a fibre optic temperature sensor 62. It is to be appreciated that any temperature sensor which can measure the temperature at two or more points downstream from each heat exchanger is also within the invention, and can include thermocouples, infra red imaging devices and simple thermometers.

The invention is further explained by the following claims.

What is claimed is:

1. An apparatus for measuring fluid flow in a conduit, said apparatus comprising: a temperature sensor for measuring and providing indication of the temperature of the fluid at least first and second temperature measuring points spaced by a known distance along the conduit; a heat exchanger selectably operable to alter the temperature of the fluid upstream from maid temperature measuring points; and a timer, responsive to said output of said temperature sensor to measure the time difference of arrival of the temperature altered fluid at said first and second temperature measuring points; and wherein said temperature sensor is a fibre optic cable, disposed alone said conduit and operative to monitor temperature at a plurality of known, spaced locations alone the length of said fibre optic cable.

2. An apparatus, according to claim 1, wherein said heat exchanger is operable to alter the temperature of the fluid for a selectable time.

3. An apparatus, according to claim 1, further comprising a flow arrester, selectably operable to arrest the flow of the fluid in the conduit, said flow arrester being operable to arrest the flow of the fluid while said heat exchanger alters the temperature of the fluid said flow arrestor being operable to allow the fluid to flow while said heat exchanger does not alter the temperature of the fluid.

4. An apparatus, according to claim 3, for use where the fluid is a hydrocarbon.

5. An apparatus, according to claim 4, wherein said hydrocarbon is oil.

6. An apparatus, according to claim 4, for use where the conduit is a hydrocarbon well.

7. An apparatus, according to claim 4, wherein said flow arrester is a selectably operable surface valve.

8. An apparatus, according to claim 1, wherein said heat exchanger is operative to heat the fluid.

9. An apparatus, according to claim 1, wherein said heat exchanger is operative to cool the fluid.

10. An apparatus, according to claim 9, wherein said heat exchanger is a gas expansion cooler.

11. An apparatus, according to claim 10, wherein said gas expansion cooler comprises a throttle for cooling the gas and a cooling coil for the throttled gas to extract heat from the fluid.

12. An apparatus, according to claim 10, wherein said gas expansion cooler comprises a pressure relief valve, operative to allow gas to pass to be expanded if the gas supply pressure exceeds a predetermined limit.

13. An apparatus, according to claim 1, wherein said fluid is water.

14. An apparatus, according to claim 1, for use where the conduit has a plurality of flow sources, said apparatus comprising: a plurality of heat exchangers, each heat exchanger being downstream from a respective flow source; said temperature sensor being operative to measure and indicate the temperature at respective first and second points downstream from each heat exchanger; and said timer being operative to measure the time difference of arrival of temperature altered fluid at each respective pair of said first and second temperature measuring points.

15. An apparatus, according to claim 14, for use where the cross-sectional area of the conduit is known, said apparatus comprising computation means to calculate the volume rate of flow past said heat exchanger or heat exchangers.

16. An apparatus, according to claim 15, wherein said computation means is operative to calculate the volume rate of flow from each flow source.

17. A method for measuring fluid flow in a conduit, said method comprising the steps of: measuring the temperature of the fluid at at least first and second temperature measuring points spaced by a known distance along the conduit; altering the temperature of the fluid upstream from said temperature measuring points; and measuring the time difference of arrival of the temperature altered fluid at said first and second temperature measuring points, wherein said temperature measuring includes the use of a fibre optic cable disposed along said conduit and operative to monitor temperature at a plurality of known, spaced locations along the length of said fibre optic cable.

18. A method, according to claim 17, including the step of altering the temperature of the fluid for a selectable time.

19. A method, according to claim 17, including the further step of arresting the flow of the fluid while altering the temperature of the fluid, and thereafter allowing the fluid to flow while not altering the temperature of the fluid.

20. A method, according to claim 19, where the fluid is a hydrocarbon.

21. A method, according to claim 20, wherein said hydrocarbon is oil.

22. A method, according to claim 20, for use where the conduit is a hydrocarbon well.

23. A method, according to claim 20, wherein said step of arresting the flow of the fluid includes the use of a selectably operable surface valve.

24. A method, according to claim 17, wherein said step of altering the temperature of the fluid involves heating the fluid.

25. A method, according to claim 17, wherein said step of altering the temperature of the fluid involves cooling the fluid.

26. A method, according to claim 25, wherein said step of cooling the fluid includes the step of gas expansion.

27. A method, according to claim 26, wherein said step of gas expansion cooling includes throttling the gas and passing the throttled gas through a cooling coil for the throttled gas to extract heat from the fluid.

28. A method, according to claim 26, including the use of a pressure relief valve to allow gas to pass to be expanded only if the gas supply pressure exceeds a predetermined limit.

29. A method, according to claim 17, wherein said fluid is water.

30. A method, according to claim 17, for use where the conduit has a plurality of flow sources, said method comprising the steps of: altering the temperature of the fluid at a plurality of points, each downstream from a respective flow source; measuring the temperature at respective first and second points downstream from each point whereat the temperature has been altered, and measuring the time difference of arrival of temperature altered fluid at each respective pair of said first and second temperature measuring points.

31. A method, according to claim 30, for use where the cross-sectional area of the conduit is known, including the step of computing the volume rate of flow past said point or points whereat the temperature of the fluid has been altered.

32. A method, according to claim 31, including the step of calculating the volume rate of flow from each flow source.

* * * * *

UNITED STATES PATENT AND TRADEMARK OFFICE
CERTIFICATE OF CORRECTION

PATENT NO. : 6,826,954 B2
DATED : December 7, 2004
INVENTOR(S) : George A. Brown It is certified that error appears in the above-identified patent and that said Letters Patent is hereby corrected as shown below:

Column 12,
Lines 41 and 42, "alone" should be -- along --.

Signed and Sealed this

First Day of March, 2005

JON W. DUDAS
*Director of the United States Patent and Trademark Office*